US008485213B2

(12) United States Patent
Hawkins et al.

(10) Patent No.: US 8,485,213 B2
(45) Date of Patent: Jul. 16, 2013

(54) INTERNAL RELIEF VALVE APPARATUS FOR USE WITH LOADING REGULATORS

(75) Inventors: James Chester Hawkins, Allen, TX (US); David Edward Woollums, Frisco, TX (US); Tung Kim Nguyen, McKinney, TX (US); Gregory Lawrence Foust, Plano, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 1107 days.

(21) Appl. No.: 12/337,252

(22) Filed: Dec. 17, 2008

(65) Prior Publication Data

US 2010/0147400 A1 Jun. 17, 2010

(51) Int. Cl.
F16K 31/365 (2006.01)
G05D 16/02 (2006.01)
F16K 31/385 (2006.01)

(52) U.S. Cl.
USPC .......... 137/116.5; 137/488; 137/505.37; 137/505.42; 137/508

(58) Field of Classification Search
USPC .......... 137/116.3, 116.5, 488, 505, 508, 137/505.11, 505.14, 505.37, 505.42, 538; 251/28, 33, 36, 37, 43, 44, 45, 46
See application file for complete search history.

(56) References Cited

U.S. PATENT DOCUMENTS

| 1,595,809 | A | * | 8/1926 | Nichols | 137/116.5 |
| 2,089,144 | A | * | 8/1937 | Work | 137/116.5 |
| 2,252,152 | A | | 8/1941 | Work | |
| 2,664,674 | A | * | 1/1954 | Niesemann | 137/116.5 |
| 2,827,069 | A | | 3/1958 | Peterson | |
| 3,032,054 | A | | 5/1962 | Irwin | |
| 3,893,475 | A | * | 7/1975 | Hudson | 137/414 |
| 4,026,314 | A | * | 5/1977 | Turner et al. | 137/116.5 |

(Continued)

FOREIGN PATENT DOCUMENTS

| EP | 0394673 | 10/1990 |
| WO | 9717641 | 5/1997 |

OTHER PUBLICATIONS

International Searching Authority, "International Search Report," issued in connection with international application serial No. PCT/US2009/065184, mailed Jul. 5, 2010, 6 pages.

(Continued)

Primary Examiner — Stephen M Hepperle
Assistant Examiner — Jonathan Waddy
(74) Attorney, Agent, or Firm — Hanley, Flight & Zimmerman, LLC

(57) ABSTRACT

An example loading regulator having an internal relief valve apparatus includes a body having a loading diaphragm disposed between a first casing and a second casing. The first casing and a first side of the loading diaphragm define a first chamber and the second casing and a second side of the loading diaphragm define a second chamber. A relief valve assembly is coupled to the loading diaphragm. The relief valve assembly includes a relief valve seat having an aperture that forms a passageway to fluidly couple the first chamber and the second chamber and a relief valve plug movably coupled to the relief valve seat. The relief valve seat is to move relative to the relief valve plug to a bleed position to allow the flow of fluid between the first chamber and the second chamber in response to an outlet pressure substantially greater than a pressure at which the loading regulator enters a lock-up condition.

20 Claims, 11 Drawing Sheets

U.S. PATENT DOCUMENTS

| | | | |
|---|---|---|---|
| 4,303,088 A * | 12/1981 | Green et al. | 137/102 |
| 4,632,143 A * | 12/1986 | McNeely | 137/488 |
| 4,889,158 A | 12/1989 | Rice et al. | |
| 5,009,245 A | 4/1991 | Esola et al. | |
| 5,303,734 A | 4/1994 | Eidsmore | |
| 5,586,569 A * | 12/1996 | Hanning et al. | 137/116.5 |
| 6,068,014 A * | 5/2000 | Tomita | 137/116.5 |
| 6,079,434 A | 6/2000 | Reid et al. | |
| 6,220,280 B1 * | 4/2001 | Lai | 137/488 |
| 6,371,156 B1 | 4/2002 | Walton et al. | |
| 6,968,857 B2 | 11/2005 | Hawkins et al. | |
| 2007/0095404 A1 * | 5/2007 | Voss | 137/538 |

OTHER PUBLICATIONS

International Searching Authority, "Written Opinion of the International Searching Authority," issued in connection with international application serial No. PCT/US2009/065184, mailed Jul. 5, 2010, 9 pages.

International Searching Authority, "Partial International Search Report," issued in connection with international application serial No. PCT/US2009/065184, mailed Mar. 19, 2010, 5 pages.

Emerson Process Management, "Types S100K and S102K Pressure Regulators," instruction manual, published Jan. 2001, 8 pages.

Emerson Process Management, "Instruction Manual for Type S201 and S202 Gas Regulators," published Sep. 1981, 8 pages.

Emerson Process Management, "Instruction Manual for Type 67C Series Instrument Supply Regulators," published May 2006, 12 pages.

American Meter Company, "American Meter Type 1883CPB2 Regulators, Pilot Loaded Regulator," Product Bulletin, published Feb. 1999, 2 pages.

American Meter Company, "Type1800C & 1800-HC Service Regulators," Product Bulletin, published Oct. 1994, 10 pages.

American Meter Company, "American Meter Series 1800CPB2 Service Regulators," Product Bulletin, Jul. 1994, 4 pages.

Emerson Process Management, "Instruction Manual for Type HSR Pressure Reducing Regulators for Residential, Commercial, or Industrial Applications," published Oct. 2003, 8 pages.

Actaris Metering Systems, " CL31 Series Commercial Regulator," published Mar. 2002, 8 pages.

Schlumberger, "Product Line Brochure," published Feb. 2001, 8 pages.

Control Air Inc., " Instrument Air Filter and Filter Regulators Type 300, Type 310 and Type 320," published Sep. 8, 2004, 4 pages.

Marsh Bellofram, "Type-41 Type 41-1 Type 41-2 Precision Air Regulators," Updated Aug. 2002, 4 pages.

Emerson Process Management, "Installation Guide for 67C and 67CF Series," published Dec. 2003, 2 pages.

American Meter Company, "Type 1800CPB2 Service Regulators," published Dec. 1998, 8 pages.

* cited by examiner

INTERNAL RELIEF VALVE APPARATUS FOR USE WITH LOADING REGULATORS

FIELD OF THE DISCLOSURE

The present disclosure relates generally to fluid regulators and, more particularly, to internal relief valve apparatus for use with loading regulators.

BACKGROUND

Process control systems utilize a variety of field devices to control process parameters. Fluid regulators are commonly distributed throughout process control systems to control the pressures of various fluids (e.g., liquids, gasses, etc.). Fluid regulators are typically used to regulate the pressure of a fluid to a lower and/or substantially constant value. Specifically, a fluid regulator has an inlet that typically receives a supply fluid at a relatively high pressure and provides a relatively lower and/or substantially constant pressure at an outlet.

As the high pressure process fluid travels through the process control system, the regulator reduces the pressure of the process fluid at one or more points to supply a process fluid having a lower or reduced pressure to a sub-system or other custody transfer points. For example, a gas regulator associated with a piece of equipment (e.g., a boiler) may receive a gas having a relatively high pressure from a gas distribution source and may regulate the gas to a lower, substantially constant pressure suitable for safe, efficient use by the equipment.

To prevent downstream pressure (i.e., outlet pressure) from reaching unsafe levels, fluid regulators typically include over pressure protection devices. Over pressure protection devices are operatively coupled to the fluid regulator and activate (e.g., when the downstream pressure of the fluid reaches a predetermined value) to prevent unwanted (e.g., unsafe) build-up of pressure at the downstream source. Some over pressure protection devices (e.g., shut-off devices) shut-off the flow of process fluid to the downstream source until the over pressure protection device is manually reset.

However, in some instances, an increase in fluid pressure due to, for example, temperature variations, may cause an undesired or unwanted activation of the over pressure protection device. To prevent unwanted activation of the over pressure protection device, some known spring-loaded fluid regulators may have an internal relief valve that is integrally formed with the fluid regulator. The internal relief valve bleeds process fluid to, for example, the atmosphere when the pressure of the process fluid increases due to, for example, temperature variations. If the downstream pressure of the process fluid exceeds the internal relief valve setting, the internal relief valve opens to bleed the fluid to the atmosphere. The over pressure protection device activates when the outlet pressure exceeds the predetermined pressure despite the process fluid bleeding through the internal relief valve. Fisher International series S201 and S202 are examples of such known spring-loaded regulators that include an internal relief valve.

Some known regulators, such as pressure-loaded regulators, do not vent to the atmosphere and, thus, an internal relief valve cannot be integrated with the regulator. In these known pressure-loaded regulators, an additional external relief valve is used to prevent unwanted activation or tripping of the over pressure protection devices due to, for example, temperature variations in the process fluid. However, such an external relief valve often requires additional installation labor, piping, manufacturing labor, inventory, maintenance, and, thus, increased costs.

SUMMARY

In one example, a loading regulator having an internal relief valve apparatus includes a body having a loading diaphragm disposed between a first casing and a second casing. The first casing and a first side of the loading diaphragm define a first chamber and the second casing and a second side of the loading diaphragm define a second chamber. A relief valve assembly is coupled to the loading diaphragm. The relief valve assembly includes a relief valve seat having an aperture that forms a passageway to fluidly couple the first chamber and the second chamber and a relief valve plug movably coupled to the relief valve seat. The relief valve seat is to move relative to e.g., away from the relief valve plug to a bleed position to allow the flow of fluid between the first chamber and the second chamber in response to an outlet pressure substantially greater than a pressure at which the loading regulator enters a lock-up condition.

In another example, a loading regulator having an internal relief valve apparatus includes a diaphragm disposed within a body of a regulator between a first chamber and a second chamber to move between at least a first position, a second position, and a third position in response to a process fluid pressure sensed by the second chamber. A relief valve seat is coupled to the diaphragm so that the relief valve seat and the diaphragm move between the first position, the second position, and the third position, wherein the relief valve seat includes an opening to form a passageway to fluidly couple the first chamber and the second chamber. A relief valve plug is slidably coupled to the relief valve seat to engage the opening to prevent the flow of fluid between the first chamber and the second chamber when the diaphragm and the relief valve seat move between the first and second positions, and in response to an outlet pressure substantially greater than a pressure at which the loading regulator enters a lock-up condition, the relief valve seat moves away from the relief valve plug to the third position to allow the flow of fluid between the first chamber and the second chamber.

In yet another example, an internal relief valve apparatus for use with loading regulators includes a relief valve seat having a cylindrical body and a first flange portion. The first flange portion includes a seating surface to engage a first side of a diaphragm when the relief valve apparatus is in a closed position and moves away from the first side of the diaphragm when the loading regulator is in a bleed condition. A biasing member is disposed between a second flange portion of the relief valve seat and a portion of the loading regulator. The biasing member biases the first side of the diaphragm toward the seating surface. A travel stop is disposed within at least a portion of the loading regulator to engage the relief valve seat so that engagement of the travel stop and the relief valve seat causes the seating surface to move away from the first side of the diaphragm when the diaphragm moves toward the travel stop.

In yet another example, an internal relief valve apparatus for use with loading regulators includes means for providing fluid communication between a first chamber and a second chamber of an actuator, wherein the second chamber is to be fluidly coupled to an outlet of a loading regulator. The internal relief valve apparatus further includes means for controlling the means for providing fluid communication to allow the flow of fluid between the first chamber and the second chamber in response to a fluid pressure at the outlet substantially greater than a pressure associated with onset of regulator lock-up.

DETAILED DESCRIPTION

Figure 1:
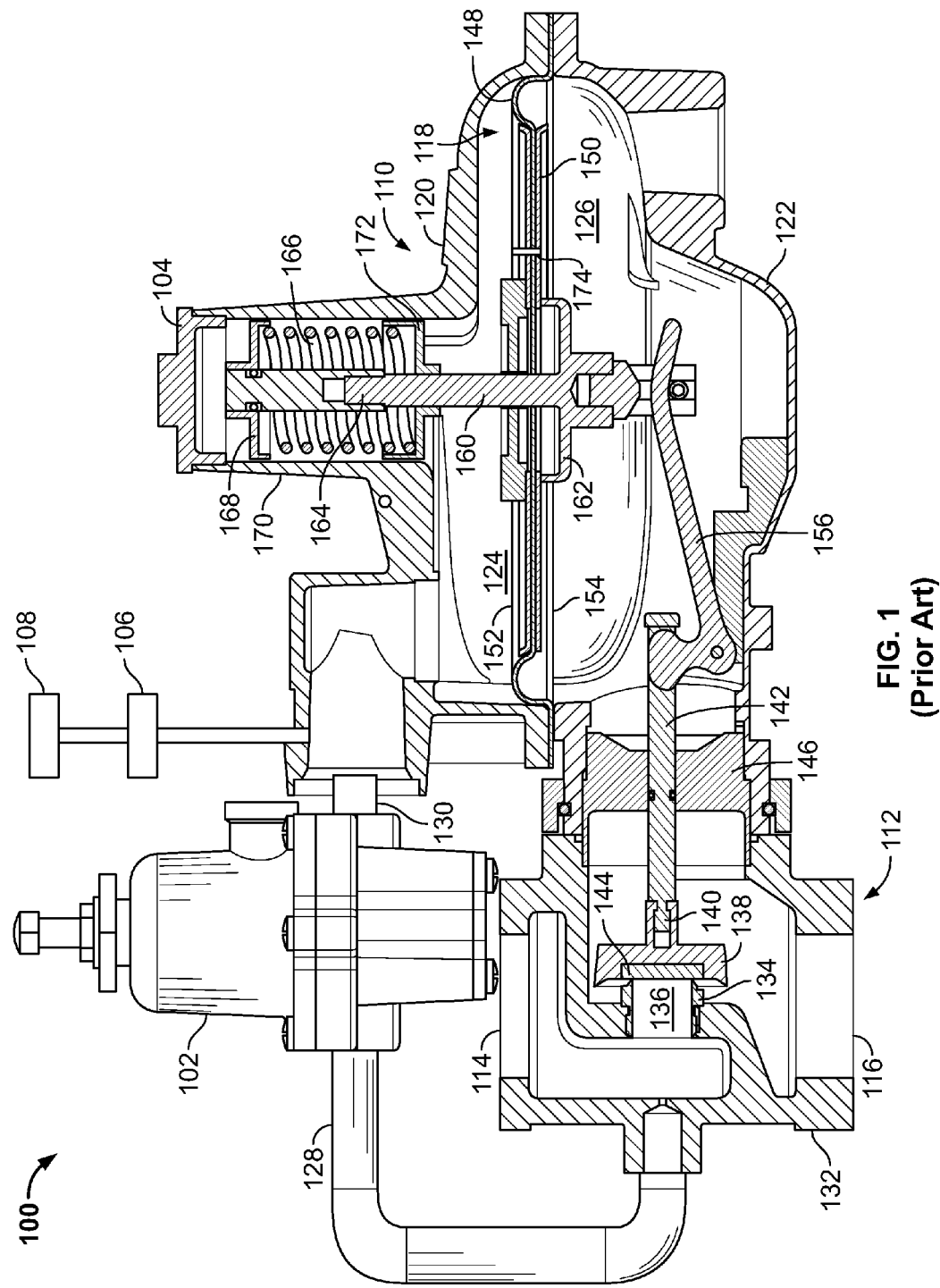
FIG. 1 illustrates a known pressure-loaded fluid regulator implemented with a known example loading regulator.

In general, fluid regulators modulate the flow of fluid in accordance with a sensed downstream pressure to maintain process system pressures within acceptable and/or constant pressure limits. Fluid regulators typically include a diaphragm operatively coupled to a valve plug via a linkage (e.g., a lever) to move the valve plug relative to a valve seat to prevent or allow the flow fluid between an inlet and an outlet. Fluid regulators typically regulate the flow and the pressure of process fluid using a pre-set control force or load applied to a first side of the diaphragm to urge the valve plug in a first direction. A second side of the diaphragm is fluidly coupled to the outlet fluid to apply a force to urge the diaphragm in a second direction opposite the first direction. Thus, the diaphragm moves the valve plug in response to a difference between the pressure of the fluid at the outlet (i.e., the force applied to the second side of the diaphragm) and the pre-set control force (i.e., the force applied to the first side of the diaphragm) to vary the flow through the regulator to achieve a substantially constant outlet pressure.

In one example, a spring-loaded regulator includes a loading element in the form of a biasing element (e.g., a spring) to apply a pre-set control force to a first side of a diaphragm. In another example, a pressure-loaded regulator includes a loading element in the form of loading pressure supplied by a loading regulator to apply a pre-set control force to a first side of a diaphragm. Pressure-loaded regulators typically provide more accurate outlet pressure regulation at higher flow rates and higher outlet pressures than spring-loaded regulators. Thus, pressure-loaded regulators are desired over spring-loaded regulators when greater accuracy of the downstream pressure is required (e.g., in metering applications).

Additionally, fluid regulators that have a maximum outlet fluid pressure rating that is lower than a maximum inlet fluid pressure rating usually require over pressure protection. In other words, over pressure protection devices are often needed for process applications having inlet pressures that exceed the outlet pressures to prevent downstream fluid pressures from exceeding a predetermined value (e.g., an unsafe pressure) or becoming greater than the inlet pressure. Safety shut-off devices and true monitoring devices are two example over pressure protection devices used with fluid regulators. A safety shut-off device typically senses the outlet pressure (downstream pressure) and closes the fluid regulator to prevent the flow of fluid through the regulator when the downstream pressure reaches a predetermined pressure. A true monitoring device usually includes a first or working regulator installed in series with a second regulator. The second regulator typically senses the downstream pressure (i.e., the control pressure) and assumes control of the downstream pressure when the working pressure regulator ceases to control the downstream pressure.

In operation, a pressure regulator moves to a closed position to prevent the flow of fluid through the regulator when the downstream demand for the process fluid decreases and/or the downstream source is shut-off (i.e., resulting in substantially zero downstream demand). For example, when the demand of the downstream source substantially decreases or is shut-off (e.g., a zero flow condition), a valve plug within the fluid regulator sealingly engages a valve seat to prevent the flow of fluid through the regulator (i.e., moves to a closed condition). However, in some instances, due to corrosion, damage to the regulator components, grit, pipe scale, etc., the valve plug may not properly seal against the valve seat, thereby allowing continued flow of process fluid between the inlet and the outlet of the regulator and causing the downstream pressure (e.g., the control pressure) to increase. The over pressure protection devices are activated when the downstream pressure increases to an unwanted pressure level (e.g., an unsafe level) to prevent excessive build-up of pressure at the downstream source. Thus, the over pressure protection devices often provide pressure relieving or pressure limiting controls to prevent a failure of a process system component resulting from an over pressure condition.

When the valve plug properly seals against (e.g., tightly engages) the valve seat and the pressure of the fluid between the outlet and the downstream source is below the predetermined safety pressure level, the over pressure protection device does not activate. However, process fluid typically remains trapped between the outlet side of the valve plug of the regulator and the downstream source. In some instances, the pressure of the fluid between the outlet and the downstream source may be subjected to pressure increases due to, for example, ambient temperature increases. An increase in the pressure of this trapped fluid at the outlet may cause the over pressure protection device to activate. To prevent unwanted activation of the over pressure protection device due to temperature variations, spring-loaded regulators typically include an internal relief valve that vents or bleeds the outlet pressure to the atmosphere. The over pressure protection device usually has a pressure setting that is greater than the pressure setting of the internal relief valve and activates when the pressure of the outlet fluid substantially exceeds the pressure setting of the internal relief valve.

However, pressure-loaded regulators are not vented and, thus, an internal relief valve cannot be integrated with the main regulator. Such a lack of an internal relief valve may cause undesired or unwanted activation of an over pressure protection device in instances for which the outlet pressure of the process fluid increases due to, for example, temperature variations, when the regulator is in the closed position. Thus, pressure-loaded regulators are not usually used with over pressure protection devices because the over pressure protection devices are susceptible to undesired activation in such applications. To prevent undesired activation of the over pressure protection devices, an external relief valve is typically coupled to a pressure-loaded regulator. However, this requires additional equipment, maintenance, installation, manufacturing and, thus, increased costs. Pilot operated regulators are typically used as an alternative to pressure-loaded regulators and, thus, external relief valves. However pilot operated regulators are more complex and, thus, relatively expensive.

Some known loading regulators include an internal relief valve device that discharges or bleeds the process fluid when the process fluid at the outlet of the main regulator is at a predetermined pressure that causes the onset of lock-up of the loading regulator. A lock-up condition occurs when the fluid is prevented from flowing through the loading regulator (e.g., when the downstream demand is substantially zero). However, venting or bleeding process fluid to the atmosphere each time the loading regulator enters or is in a lock-up condition may be undesirable because a lock-up condition may occur frequently and, thus, a large amount of process fluid may bleed to the atmosphere. For example, these known loading regulators are typically not suitable for process applications involving hazardous fluid (e.g., natural gas) because the loading regulator relief valve starts to discharge or bleed the process fluid to the atmosphere upon or at the onset of a lock-up condition of the loading regulator. Thus, for applications involving hazardous fluid, a relief valve that does not begin to discharge at the onset of lock-up would be advantageous. In other words, a relief valve apparatus having a pressure offset to provide a substantial deadband or substantial operational separation between a lock-up condition of the loading regulator and a bleed condition of the relief valve would be advantageous.

In practice, loading regulators are operatively coupled to a main fluid regulator. As noted above, loading regulators supply pressure to provide a pre-set control force to the main regulator. However, the main regulator typically enters a lock-up condition (i.e., substantially zero flow through the main regulator) at an outlet fluid pressure that is greater than an outlet fluid pressure that causes the loading regulator to enter into a lock-up condition. However, as noted above, known loading regulators having internal relief valves typically start to discharge or bleed fluid at the onset of the lock-up condition of the loading regulator. As a result, in an overpressure situation, the loading regulator starts to discharge or bleed process fluid prior to the onset of the lock-up condition of the main regulator. Further, these known loading regulators lack means to control the pressure at which the loading regulator starts to discharge or bleed so that the onset of the bleed condition can be set to activate when the outlet fluid pressure exceeds or is greater than the fluid pressure that causes the main regulator to lock-up.

As a result, failing to control the start to discharge pressure point or setting of the loading regulator (i.e., the pressure at which the loading regulator bleeds) causes the loading regulator to discharge or bleed at an outlet fluid pressure that is lower than an outlet fluid pressure that causes a lock-up condition to the main regulator. Venting or bleeding process fluid to the atmosphere each time the loading regulator enters a lock-up condition causes a large amount of process fluid to bleed to the atmosphere. For example, process fluid may bleed to the atmosphere for a lengthy period of time if a downstream demand causes the outlet pressure to be at a pressure that causes the loading regulator to lock-up (and thus bleed), but below a pressure that causes the main regulator to lock-up. As a result, pressure-loaded regulators are typically not suitable for process applications involving hazardous fluid (e.g., natural gas). Thus, it is desirable for a loading regulator to bleed when the outlet fluid pressure is at a pressure that causes the loading regulator and the main regulator to lock-up. Also, configuring the loading regulator to lock-up at a pressure that is greater than a pressure that causes the main regulator to lock-up is undesirable because the loading regulator will attempt to regulate the fluid and assume control of the downstream pressure, thereby providing an undesirable and/or improper downstream control pressure.

The example internal relief valve apparatus described herein provide a relief valve activation pressure offset by providing a substantial deadband or substantial separation between a main regulator outlet pressure at which a lock-up condition of a loading regulator occurs or onsets and a main regulator outlet pressure at which a bleed condition or start to discharge point of the internal relief valve occurs or onsets. Additionally, the example internal relief valve apparatus described herein provide a pressure offset between a main regulator outlet pressure at which a lock-up condition of a main regulator occurs or onsets and a main regulator outlet pressure at which a bleed condition of the internal relief valve of the loading regulator occurs or onsets. In other words, the example internal relief valve apparatus described herein controls a pressure offset between an outlet fluid pressure that causes onset of a bleed condition of the internal relief valve apparatus and an outlet fluid pressure that causes onset of loading regulator lock-up and/or main regulator lock-up. In the example described herein, the pressure offset is set so that the pressure at which the internal relief valve of the loading regulator bleeds is substantially greater than the outlet pressure at which the main regulator locks-up and the outlet pressure at which the loading regulator locks-up.

Thus, the example relief valve apparatus described herein provide an adjustable pre-set force for the relief valve so that the relief valve can be set to activate at different predetermined fluid outlet pressures. Additionally, the example internal relief valve apparatus described herein are advantageously integrated with pressure loading regulators to provide increased accuracy by substantially minimizing unwanted venting or bleeding of process fluid to the atmosphere and/or unwanted or undesired activation of the over pressure protection devices operatively coupled to the loading regulators and/or the main regulators. Thus, the example relief valve apparatus described herein enable over pressure protection devices to be used with pressure-loaded regulators without the need for an external relief valve.

Before discussing the details of the example internal relief valve apparatus described herein, a description of an example known pressure-loaded fluid regulator 100 is provided in FIG. 1. As shown in FIG. 1, the known example pressure-loaded regulator 100 includes a known example loading regulator 102 to provide a control pressure or load to a main regulator 104. An external relief valve 106 is fluidly coupled to the main regulator 104 so that the example pressure-loaded regulator 100 may be used with hazardous process fluid such as, for example, natural gas. An over pressure protection device 108 may also be fluidly coupled to the example pressure-loaded regulator 100. The external relief valve 106 may be fluidly coupled between the pressure-loaded regulator 104 and the over pressure protection device 108 to prevent unwanted activation of the over pressure protection device 108. However, the external relief valve 106 requires added assembly, inventory, manufacturing, maintenance, etc., which increase costs. Alternatively, a pilot regulator may be used instead of the loading regulator 102 and the external valve 106. However, such known pilot regulators more complex and more expensive.

As depicted in FIG. 1, the example main regulator 104 includes an actuator 110 that is operatively coupled to a valve 112 having an inlet 114 and an outlet 116. The actuator 110 includes a main diaphragm assembly 118 disposed between a first actuator casing 120 and a second actuator casing 122. The first actuator casing 120 defines a loading chamber 124 and the second actuator casing 122 defines a control chamber 126. The loading regulator 102 includes a loading inlet 128 fluidly coupled to the inlet 114 of the valve 112 and a loading outlet 130 in fluid communication with the loading chamber 124 to provide a loading pressure to the loading chamber 124.

The valve 112 includes a valve body 132 that is coupled to the lower actuator casing 122. A valve seat 134 is mounted in the valve body 132 and defines an orifice 136 through which fluid may flow between the inlet 114 and the outlet 116. A valve plug 138 attached to a first end 140 of a valve stem 142 includes a sealing disk 144 (e.g., an elastomeric sealing disk) that sealingly engages the valve seat 134 to prevent the flow of fluid between the inlet 114 and the outlet 116. A stem guide 146 aligns the valve stem 142 and the sealing disk 144 with at least one of the lower actuator casing 122, the valve body 132, or the valve seat 134. Although not shown, the stem guide 146 includes at least one passageway to fluidly couple the outlet 116 and the control pressure chamber 126.

The diaphragm assembly 118 includes a diaphragm 148 supported by a diaphragm plate 150 and has a first side or surface 152 exposed to the loading chamber 124 and a second side or surface 154 exposed to the control pressure chamber 126. The diaphragm 148 is operatively coupled to the valve plug 138 via the valve stem 142 and a lever 156 and causes the valve plug 138 to move toward the valve seat 134 to prevent the flow of fluid between the inlet 114 and the outlet 116 when the diaphragm 148 moves toward the control pressure chamber 126. The lever 156 is coupled to the diaphragm 148 via the diaphragm plate 150 and a pusher post assembly 160. A first end 162 of the pusher post assembly 160 engages the second side 154 of the diaphragm 148 via the diaphragm plate 150 and a second end 164 of the pusher post assembly 160 is operatively coupled to a closing spring 166 via an adjustable spring seat or screw 168. The closing spring 166 is disposed within a spring casing 170 between the adjustable spring seat 168 and a second spring seat 172 (e.g., a body portion of the spring casing 170). The closing spring 166 provides a pre-set load or force that biases the diaphragm 148 toward the loading chamber 124 via the pusher post assembly 160 which, in turn, causes the valve plug 138 to move toward the valve seat 134 to prevent the flow of fluid through the valve 112 (e.g., a closed condition). The amount of force exerted by the closing spring 166 can be adjusted (e.g., increased or decreased) via the adjustable spring seat 168. Also, the diaphragm plate 150 includes a passageway or a bleed hole 174 to fluidly couple the loading chamber 124 and the control pressure chamber 126 and, thus, fluidly couple the loading outlet 130 of the loading regulator 102 and the outlet 116 of the main regulator 104.

Figure 2:
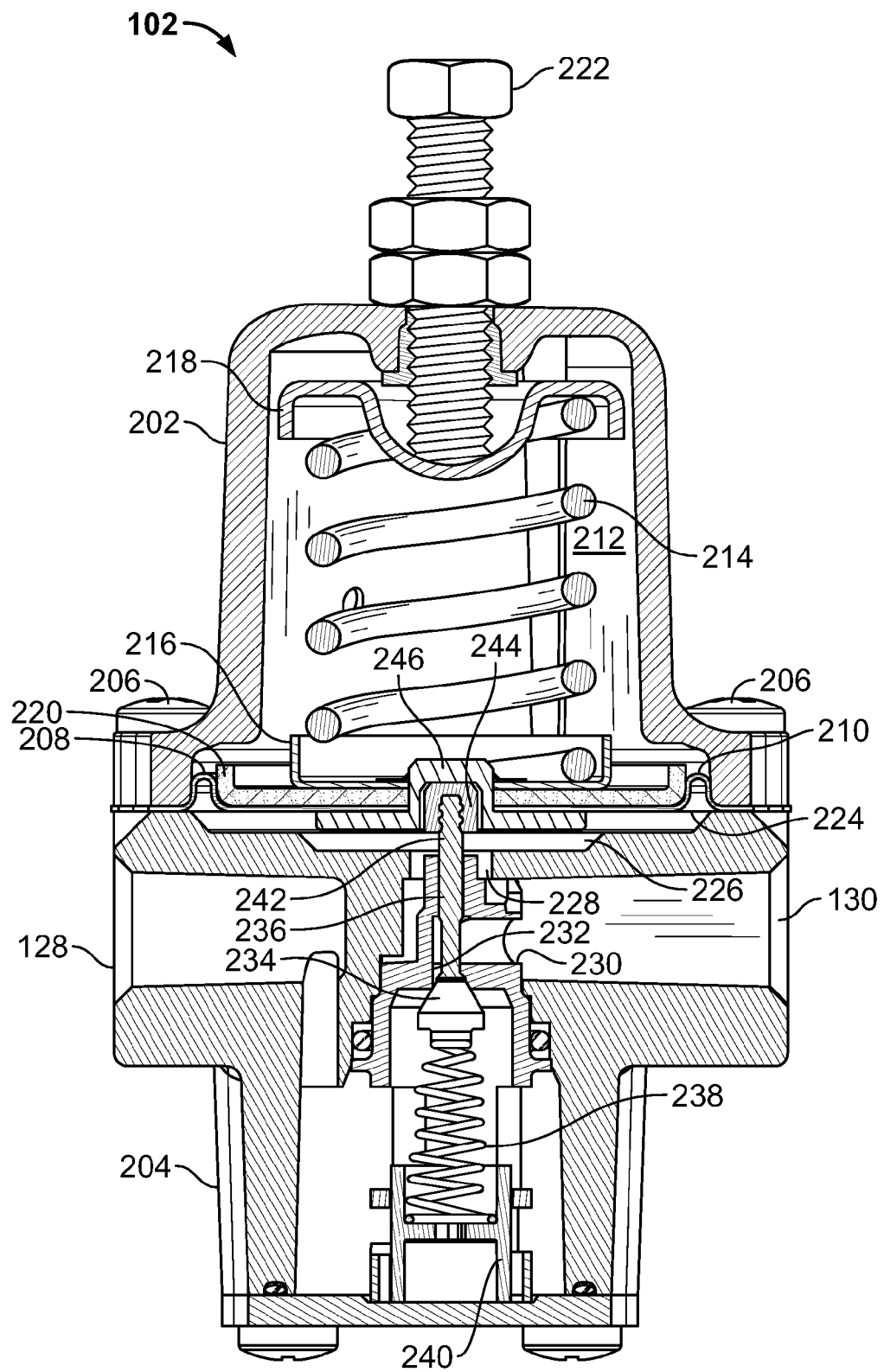
FIG. 2 is a cross-sectional view of the known loading regulator of FIG. 1.

FIG. 2A illustrates a cross-sectional view of the example known loading regulator 102 of FIG. 1. Referring to FIGS. 1 and 2, the example loading regulator 102 includes an upper body 202 and a lower body 204 that are coupled together via a plurality of fasteners 206. A loading diaphragm 208 is disposed between the upper body 202 and the lower body 204. The upper body 202 and a first side 210 of the loading diaphragm 208 define a first chamber 212. A loading spring 214 is disposed between a first spring seat 216 and an adjustable second spring seat 218. In the example, the first chamber 212 is fluidly coupled to, for example, the atmosphere.

The first spring seat 216 is coupled to a loading diaphragm plate 220 that supports the loading diaphragm 208. A loading spring adjuster 222 (e.g., a screw) engages the second spring seat 218 to adjust the length of the loading spring 214 (e.g., compress or decompress the loading spring 214) and, thus, adjust (e.g., increase or decrease) the amount of a pre-set force or load that the loading spring 214 exerts on the first side 210 of the loading diaphragm 208.

The lower body 204 and a second side 224 of the loading diaphragm 208 at least partially define a second chamber 226, the loading inlet 128, and the loading outlet 130. The second chamber 226 is fluidly coupled to the loading outlet 130 via a channel 228 and, thus, is in fluid communication with the loading chamber 124 (FIG. 1) of the main regulator 104. A loading valve seat 230 is disposed within the lower body 204 and defines an orifice 232 between the loading inlet 128 and the loading outlet 130. A loading valve plug 234 is operatively coupled to the loading diaphragm 208 via a loading valve stem 236 and the loading diaphragm plate 220. A second spring 238 is disposed between a second spring seat 240 and the loading valve plug 234 to bias the loading valve plug 234 toward the loading valve seat 230. The spring rate of the second spring 238 is typically substantially smaller relative to the spring rate of the loading spring 214. In the illustrated example, a second end 242 of the loading valve stem 236 includes a soft or compliant seat 244 that engages a coupling seat 246 coupled to the loading diaphragm plate 220.

Referring to FIGS. 1 and 2, in operation, the inlet 114 is in fluid communication with, for example, a gas distribution source that provides fluid having a relatively high pressure. The outlet 116 of the valve 112 is in fluid communication with a downstream demand source or other custody point that demands process fluid at a desired (e.g., a lower) pressure.

The loading regulator 102 typically regulates the upstream pressure of the fluid at the inlet 114 to provide or develop a desired loading pressure to the loading chamber 124 of the main regulator 104. To achieve a desired loading pressure, the loading spring 214 positions the loading valve plug 234 relative to the loading valve seat 230 to restrict the flow of the process fluid between the loading inlet 128 and the loading outlet 130. Thus, the loading pressure is dependent upon the amount of force exerted by the loading spring 214 to position the loading diaphragm 208 and, thus, the loading valve plug 234 relative to the loading valve seat 230. The desired loading pressure set point may be configured by adjusting the force exerted by the loading spring 214 on the first side 210 of the diaphragm 208 via the adjusting screw 222.

When demand increases at the outlet 116, the pressure of the fluid at the outlet 116 momentarily decreases. The second chamber 226 of the loading regulator 102 senses the decreasing pressure of the process fluid at the outlet 116 via the channel 228 and the bleed hole 174. Thus, when the pressure of the process fluid at the loading outlet 130 decreases to reduce the force exerted on the second side 224 of the diaphragm 208 to be below the pre-set force exerted by the loading spring 214 on the first side 210 of the diaphragm 208, the loading spring 214 causes the loading diaphragm 208 to move toward the second chamber 226. When the loading diaphragm 208 moves toward the second chamber 226, the loading valve plug 234 moves away from the loading valve seat 230 to allow fluid to flow through the orifice 232 between the loading inlet 128 and the loading outlet 130 (e.g., an open position), thereby causing the pressure at the loading outlet 130 to increase.

The loading pressure is provided to the loading chamber 124 of the main regulator 104. In turn, the loading pressure applies a force to the first side 152 of the diaphragm 148 to cause the diaphragm 148 to move toward the control pressure chamber 126 (e.g., in a downward direction in the orientation of FIG. 1). When the diaphragm 148 moves toward the control pressure chamber 126, the diaphragm 148 causes the lever 156 to move the valve plug 138 away from the valve seat 136 to allow the flow of fluid through the orifice 136 between the inlet 114 and the outlet 116 to satisfy the downstream demand.

Conversely, as the outlet or downstream demand decreases or is shut-off, the pressure of the process fluid at the outlet 116 increases. The increasing pressure at the outlet 116 is registered to the second chamber 226 of the loading regulator 102 via the bleed hole 174 of the diaphragm plate 150 and the channel 228. The outlet pressure exerts a force on the second side 224 of the loading diaphragm 208. The force applied on the second side 224 overcomes the force exerted by the loading spring 214 on the first side 210 when the pressure of the fluid at the loading outlet 130 exerts a force on the second side 224 of the loading diaphragm 208 that exceeds the pre-set force exerted by the loading spring 214 on the first side 210 of the loading diaphragm 208. When this occurs, the loading diaphragm 208 moves toward the first chamber 212, which causes the loading valve plug 234 to move toward the loading valve seat 230 to restrict the flow of fluid through the orifice 232. The second spring 238 biases the loading valve plug 234 to sealingly engage the loading valve seat 230 (e.g., in a closed position) to substantially prevent the fluid flow through the orifice 232 between the loading inlet 128 and the loading outlet 130 and, thus, reduce supply of the loading pressure to the loading chamber 124.

A lock-up condition of the loading regulator 102 occurs when the loading valve plug 234 sealingly engages the loading valve seat 230 to provide a tight seal and prevent the flow of fluid through the orifice 232 between the loading inlet 128 and the loading outlet 130. As a result, the loading pressure in the loading chamber 124 decreases. As noted above, the closing spring 166 biases the diaphragm 128 toward the loading chamber 124. Thus, when the loading regulator 102 is in the lock-up condition, the diaphragm 148 moves toward the loading chamber 124 (i.e., in an upward direction). The movement of the diaphragm 148 toward the loading chamber 124 causes the lever 156 to move the valve plug 138 toward the valve seat 134 of the valve 112. In some instances, the pressures in the loading chamber 124 and control pressure chamber 126 equalize via the bleed hole 174. The closing spring 166 biases the diaphragm 148 toward the first side 152 or the loading chamber 124 (e.g., upward), for example, when the pressures in the chambers 124 and 126 equalize to cause the valve plug 138 to sealingly engage the valve seat 134 to prevent the flow of fluid between the inlet 114 and the outlet 116. A lock-up condition of the main regulator 104 occurs when the valve plug 138 sealingly engages the valve seat 134 to provide a substantially zero flow condition through the main regulator 104 (i.e., from the inlet 114 to the outlet 116). The loading regulator 102 locks-up at an outlet fluid pressure that is less than the outlet fluid pressure that causes the main regulator 104 to lock-up. Otherwise the loading regulator 102 will attempt to regulate the fluid and assume control of the downstream pressure if the main regulator 104 locks-up at a fluid pressure that is less than the fluid pressure at which the loading regulator 102 locks-up, thereby providing an undesirable and/or improper downstream control pressure. For example, because a force provided by the loading spring 214 to the loading diaphragm 208 may be adjusted via the adjustor 222 and a force provided by the spring 166 to the main diaphragm 148 may be adjusted via the adjustor 168, the loading regulator 102 may be configured to lock-up when the process fluid pressure at the outlet 116 is at a first pressure value and the main regulator 104 may be configured to lock-up when the process fluid pressure at the outlet 116 is a second pressure value different than the first pressure value. In other words, the loading regulator 102 may be configured to lock-up at a first outlet pressure value that is sufficient to overcome the force exerted by the loading spring 214 imparted to the loading diaphragm 210, but is insufficient to overcome the force imparted by the pressure in the loading chamber 124 to the first side 152 of the main diaphragm 148. Thus, a second outlet pressure greater than the first outlet pressure may be required to overcome the force imparted to the first side 152 of the main diaphragm 148. When the valve plug 138 sealingly engages the valve seat 134, pressurized fluid remains trapped between the outlet 116 and the downstream source (not shown).

In some instances, due to corrosion, damage to the regulator components, grit, pipe scale, etc., the valve plug 138 of the main regulator 104 may fail to tightly seal against the valve seat 134. As a result, high pressure process fluid from the inlet 114 continues to flow to the outlet 116. Consequently, the downstream pressure at the outlet 116 increases (despite the fact that the valve 112 is in a closed condition) because the demand of the downstream source is substantially reduced (e.g., substantially zero demand). The over pressure protection device 108 activates when the pressure of the fluid at the outlet 116 increases to a predetermined pressure level (e.g., a predetermined safety pressure level).

Additionally, in some instances, when the main regulator 104 is in a closed position, the process fluid remaining between the outlet 116 and the downstream source may be subjected to a temperature increase, thereby causing the pressure of the fluid at the outlet 116 to increase. Such an increase in pressure of the fluid at the outlet 116 due to a temperature increase may also cause the over pressure protection device 108 to activate. As stated above, because the loading chamber 124 is not vented, the external relief valve 106 is typically coupled to the pressure-loaded regulator 100 to prevent unwanted activation of the over pressure protection device 108. However, it may be undesirable and/or more expensive to use the external relief valve 106 with the pressure-loaded regulator 102 and the over pressure protection device 108.

Figure 3:
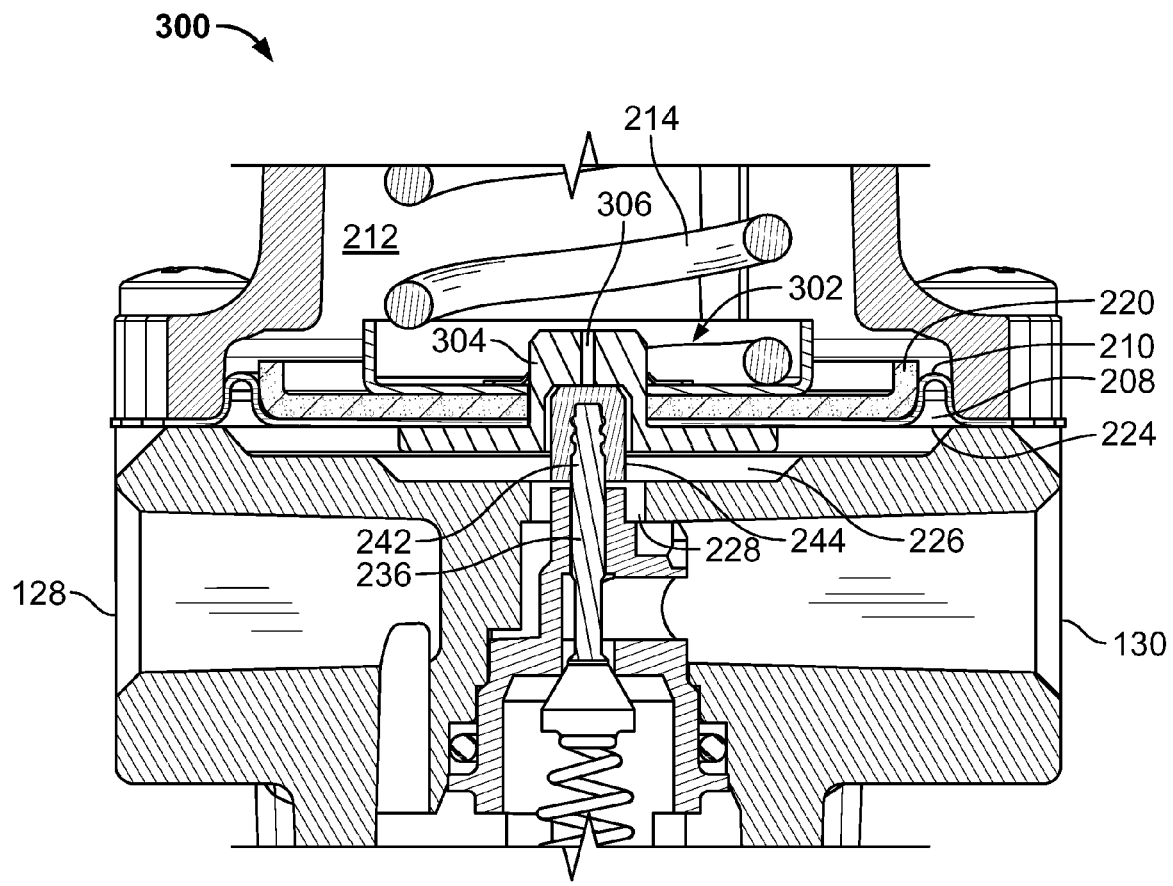
FIG. 3 illustrates a portion of another known loading regulator that is implemented with a known internal relief valve apparatus.

FIG. 3 illustrates a known example loading regulator 300 that includes an internally integrated relief valve 302. Those components of the example loading regulator 300 that are substantially similar or identical to the components of the example loading regulator 102 described above have reference numbers corresponding to the components of FIG. 1 to which they are identical or similar and will not be described in detail again below. Instead, the interested reader is referred to the corresponding descriptions described above in connection with FIGS. 1 and 2.

The internal relief valve 302 includes a relief valve seat 304 that is operatively coupled to the diaphragm 208 via the diaphragm plate 220. The relief valve seat 304 includes an aperture 306 that fluidly couples the first chamber 212 and the second chamber 226. The soft seat 244 of the loading valve stem 236 engages the aperture 306 of the relief valve seat 304 to prevent (e.g., block) the flow of fluid between the first and second chambers 212 and 226, respectively.

In operation, when the pressure of the fluid at the loading outlet 130 exerts a force on the second side 224 of the loading diaphragm 208 that is less than the force exerted on the first side 210 by the loading spring 214, the soft seat 244 engages the aperture 306 of the relief valve seat 304 to prevent unwanted leakage of fluid between the first and second chambers 212 and 226. The loading diaphragm 208 moves toward the first chamber 212 (e.g., an upward direction against the force exerted by the loading spring 214 in the orientation of FIG. 3) when the pressure of the fluid at the loading outlet 130 exerts a force on the second side 224 of the loading diaphragm 208 that equals or exceeds the load exerted by the loading spring 214. The relief valve seat 304, which is coupled to the loading diaphragm 208 via the loading diaphragm plate 220, moves away from the soft seat 244 to fluidly couple the second chamber 226 and the first chamber 212 to bleed or vent the pressure to, for example, the atmosphere. Thus, the loading regulator 300 provides a bleed condition when the pressure of the fluid in the second chamber 226 exerts a force that causes the loading regulator 300 to move to a lock-up condition (i.e., at the onset of lock-up).

Thus, the example loading regulator 300 is typically used with non-hazardous process fluid such as, for example, air, and is not suitable for hazardous applications such as, for example, natural gas. More specifically, the example loading regulator 300 is not suitable for hazardous applications because the relief valve 302 discharges or bleeds the fluid upon or at the lock-up condition, which may occur frequently. Thus, the example loading regulator 300 is not suitable for hazardous applications because hazardous fluid applications usually require a relief valve that does not begin to discharge or bleed fluid to the atmosphere upon lock-up of the loading regulator 300.

Furthermore, when coupled to a regulator such as, for example, the main regulator 104 of FIG. 1, the loading regulator 300 starts to discharge or bleed fluid at an outlet fluid pressure that is less than an outlet fluid pressure in which the main regulator 104 enters lock-up. Additionally, this relationship cannot be corrected because the loading regulator 300 lacks means to control a pressure offset between the outlet fluid pressure that causes onset of the bleed condition of the internal relief valve 302 and the outlet fluid pressure that causes onset of the lock-up condition of the main regulator 104.

Figure 4A:
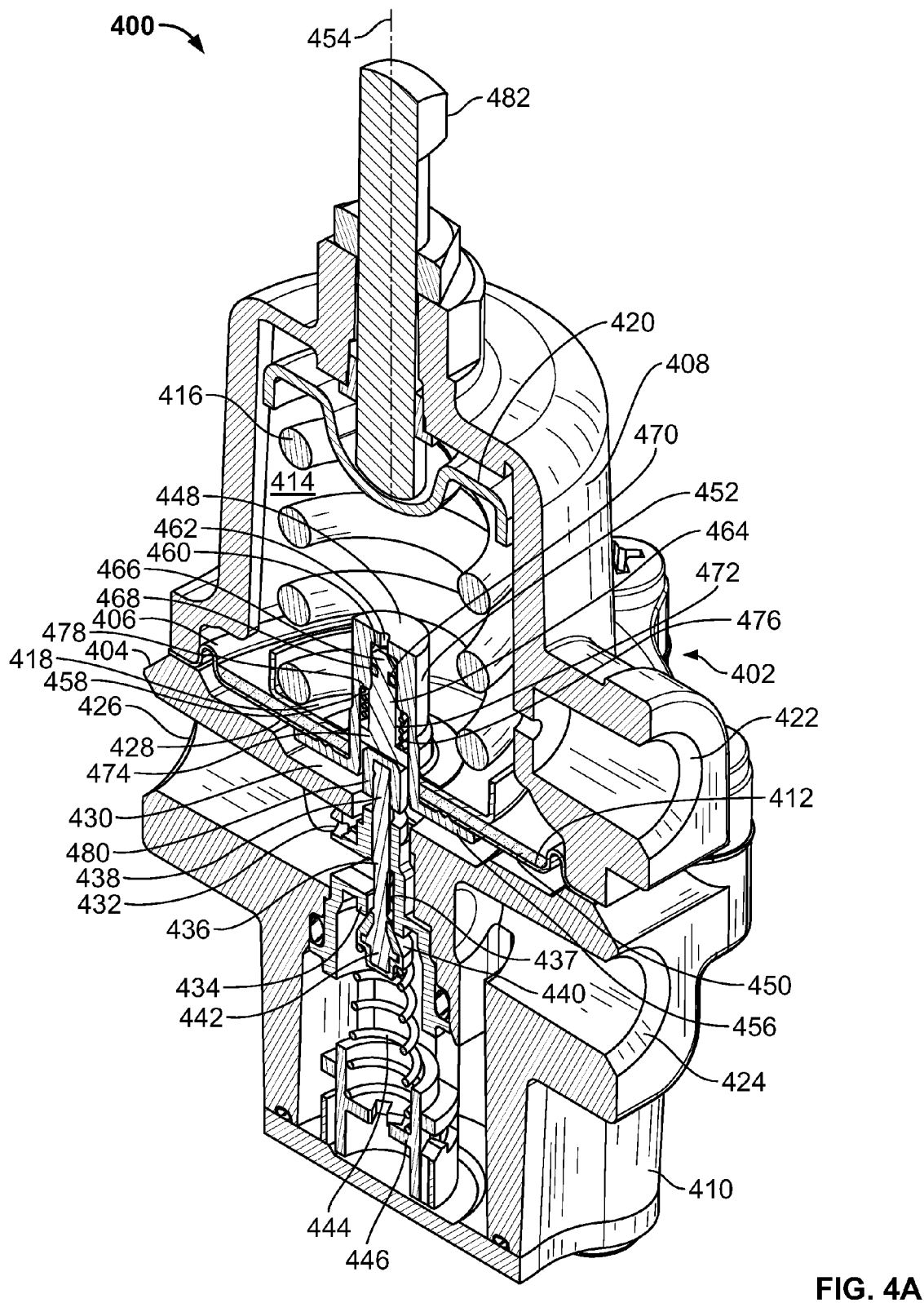
FIG. 4A illustrates an example loading regulator having an example internal relief valve apparatus described herein.
Figure 4B:
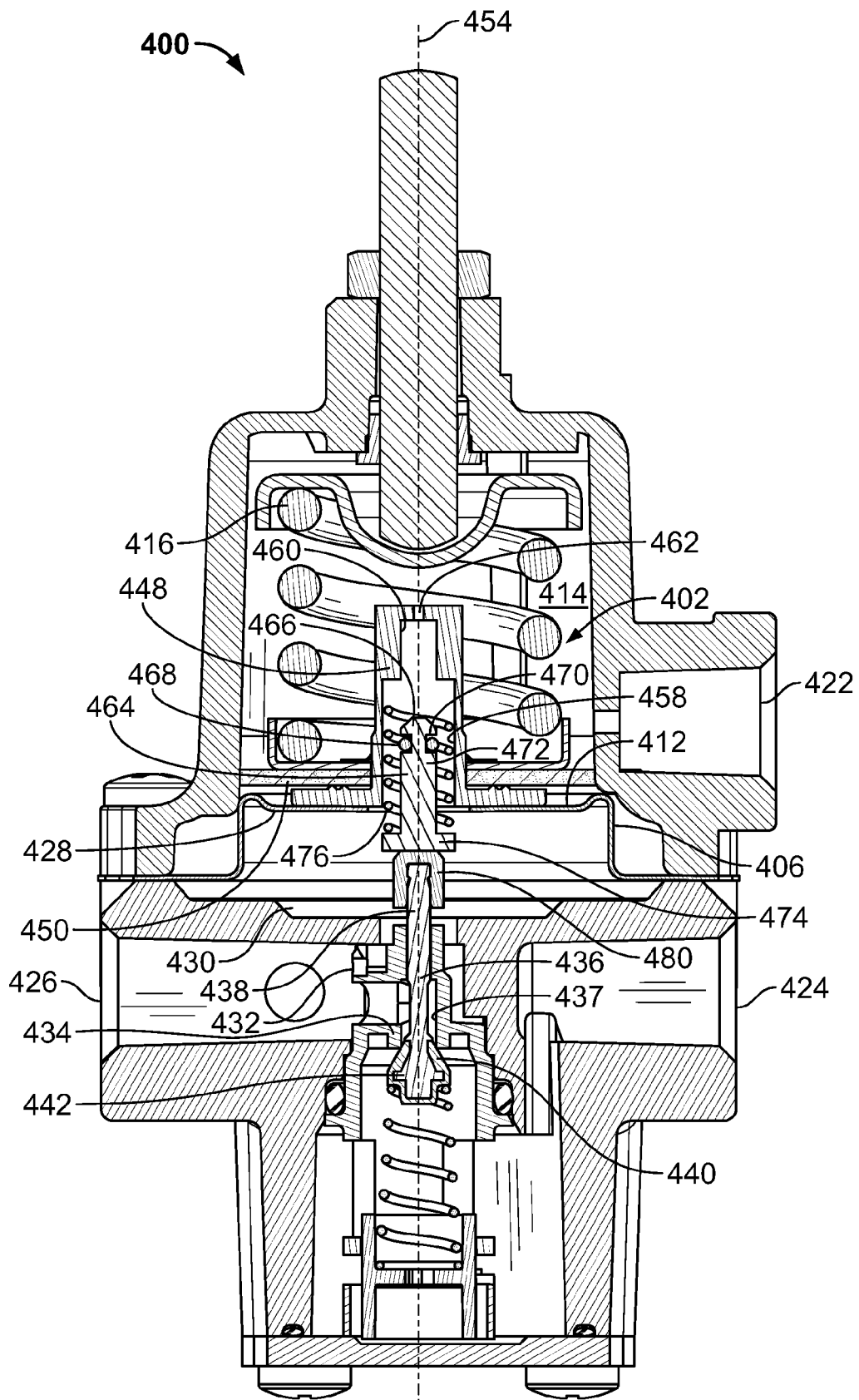
FIG. 4B illustrates a cross-sectional view of the example loading regulator of FIG. 4A.

FIG. 4A illustrates a cross-sectional view of an example loading regular 400 that may be used with the example main regulator 104 of FIG. 1. The example loading regulator 400 includes an internal relief valve apparatus or assembly 402 that provides a substantial offset (e.g., a pressure offset) or substantial deadband between a regulator outlet pressure at which a lock-up condition or closed condition of the loading regulator 400 occurs or onsets and a regulator outlet pressure at which a bleed condition of the internal relief valve apparatus 402 occurs or onsets. Additionally, when operatively coupled to a main regulator (e.g., the main regulator 104 of FIG. 1), the example internal relief valve apparatus 402 enters a bleed condition at an outlet fluid pressure that is substantially greater than an outlet fluid pressure at which a lock-up condition of the main regulator 104 occurs or onsets. In other words, the example internal relief valve apparatus 402 controls a pressure offset between an outlet fluid pressure that causes onset of a bleed condition of the internal relief valve apparatus 402 and an outlet fluid pressure that causes onset of loading regulator and/or main regulator lock-up. FIG. 4B is another cross-sectional view of the example loading regulator 400 of FIG. 4A showing the internal relief valve apparatus 402 in a bleed condition.

Referring to FIGS. 4A and 4B, the loading regulator 400 includes a body 404 having a loading diaphragm 406 disposed between a first casing 408 and a second casing 410. The first casing 408 and a first side 412 of the loading diaphragm 406 define a first chamber 414. A loading spring 416 is disposed within the first casing 408 between a first spring seat 418 and an adjustable second spring seat 420. The loading spring 416 applies or exerts a force on the first side 412 of the loading diaphragm 406 to cause the loading diaphragm 406 to move toward the second casing 410 (e.g., in a downward direction in the orientation of FIGS. 4A and 4B). The first chamber 414 includes a vent or opening 422 to fluidly couple the first chamber 414 to, for example, the atmosphere.

The second casing 410 defines a passageway between a loading inlet 424 and a loading outlet 426. The loading inlet 424 fluidly couples to an inlet (e.g., the inlet 114 of FIG. 1) of a regulator (e.g., the regulator 104) and the loading outlet 426 fluidly couples to a loading chamber (e.g., the loading chamber 126) of a main regulator (e.g., the main regulator 104). The second casing 410 and a second side 428 of the loading diaphragm 406 define a second chamber 430. The second chamber 430 is in fluid communication with the loading outlet 426 via a channel 432 to sense changes in the pressure of the process fluid at an outlet (e.g., the outlet 116 of FIG. 1) of a main regulator (e.g., the main regulator 104). A loading valve seat 434 is disposed within the second casing 410 to define an orifice 437 through which process fluid may flow between the loading inlet 424 and the loading outlet 426. A loading valve stem 436 is operatively coupled to the loading diaphragm 406 at a first end 438 and includes a loading valve plug 440 at a second end 442. The loading valve plug 440 is operatively coupled to the loading diaphragm 406 and moves toward the loading valve seat 434 to prevent the flow of fluid through the orifice 437 and moves away from the loading valve seat 434 to allow the flow of fluid through the orifice 437. A closing spring 444 is disposed between the loading valve plug 440 and a valve plug spring seat 446 to bias the loading valve plug 440 toward the loading valve seat 434.

The internal relief valve apparatus 402 is configured to move away from a relief valve seat 448 in a bleed position to allow the flow of fluid between the first chamber 414 and the second chamber 430 in response to a pressure greater than a pressure at which the loading regulator enters a lock-up condition. In this example, the relief valve seat 448 is coupled to the loading diaphragm 406 via a diaphragm plate 450. The relief valve seat 448 includes a cylindrical body 452 extending along a longitudinal axis 454 and a flange portion 456. The cylindrical body 452 includes a first cavity or aperture 458, a second cavity or aperture 460 having a diameter smaller than the diameter of the first aperture 458, and a third aperture 462 having a diameter smaller than the diameter of the first and second apertures 458 and 460. The first, second, and third apertures 458, 460, and 462 form a passageway to fluidly couple the first chamber 414 and the second chamber 430. A relief valve plug 464 is slidably coupled to the relief valve seat 448 to move toward the third aperture 462 to prevent the flow of fluid between the first and second chambers 414 and 430, and to move away from the third aperture 462 to allow the flow of fluid between the first and second chambers 414 and 430. The relief valve plug 464 engages or obstructs the third aperture 462 when a first portion 466 of the relief valve plug 464 is disposed within the second aperture 460 of the relief valve seat 448.

A restrictive or frictional member 468 (e.g., an O-ring) is disposed between at least a portion of the relief valve plug 464 and a portion of the relief valve seat 448. In the example, the restrictive or frictional member 468 is disposed within a channel or annular groove 470 formed in the relief valve plug 464. However, in other examples, the restrictive or frictional member 468 may be disposed within a channel or annular groove formed in the second aperture 460 of the relief valve seat 448 or disposed in any other suitable location between the relief valve plug 464 and the relief valve seat 448. Additionally or alternatively, although not shown, a plurality of O-rings and/or differently sized O-rings may be disposed between at least a portion of the relief valve plug 464 and the relief valve seat 448 to provide more or less resistance or friction so that the internal relief valve apparatus 402 may be set to activate at different desired predetermined fluid outlet pressures.

In other examples, at least a portion of the relief valve plug 464 may be made of, for example, rubber, Teflon®, or any other suitable material to frictionally engage the relief valve seat 448 to provide a substantial pressure offset between a fluid pressure that causes the onset of a lock-up condition and a fluid pressure that causes the onset of a bleed condition. In yet other examples, the relief valve plug 464 may include annular ridges, deformations, protrusions, or any other suitable geometries and/or materials to enable the relief valve plug 464 to engage the relief valve seat 448 to provide the substantial pressure offset. In yet other examples, the relief valve seat 448 may include annular grooves to receive O-rings, a liner made of, for example, rubber, protrusions and/or other geometry and/or material so that the relief valve plug 464 frictionally engages the relief valve seat 448 to provide the substantial pressure offset.

The relief valve plug 464 engages the third aperture 462 of the relief valve seat 448 in a closed position (FIG. 4A) to prevent the flow of fluid between the first chamber 414 and the second chamber 430 and moves away from the second aperture 460 and the third aperture 462 at a bleed position (FIG. 4B) to allow the flow of fluid between the first chamber 414 and the second chamber 430. The restrictive or frictional member 468 provides a resistance (e.g., a frictional force) to oppose the relief valve seat 448 from moving away from the relief valve plug 464 (i.e., the bleed condition of FIG. 4B) when the example loading regulator 400 is at a lock-up condition (i.e., the closed position of FIG. 4A). In other words, a pressure at an outlet (e.g., the outlet 116) of a main regulator (e.g., the main regulator 104) that causes a lock-up condition of the loading regulator 400 does not cause the relief valve apparatus 102 to open or bleed at the onset of or upon lock-up. Instead, an additional build-up of pressure substantially greater than the pressure of the fluid to cause the lock-up condition is required to overcome the resistance (e.g., frictional resistance) exerted by the restrictive member 468 to move the relief valve apparatus 402 to the bleed condition.

Additionally, when operatively coupled to the main regulator 104, a lock-up condition of the main regulator 104 does not cause the relief valve apparatus 102 to open or bleed immediately or upon lock-up of the main regulator 104. Instead, an additional build-up of pressure substantially greater than the pressure to cause the lock-up condition of the main regulator 104 is required to overcome the resistance (e.g., frictional resistance) exerted by the restrictive member 468 to move the relief valve apparatus 402 to the bleed condition. As shown in FIG. 4B, in the bleed condition, the relief valve seat 448 is moved away from the relief valve plug 464 to allow the flow of fluid between the first chamber 414 and the second chamber 430.

In the illustrated example, the relief valve plug 464 includes a stem portion 472 and a flange portion 474. A relief biasing element 476 such as, for example, a relief spring is disposed between a shoulder 478 of the relief valve seat 448 and the flange portion 474 of the relief valve plug 464 to bias the relief valve plug 464 toward the first end 438 of the loading valve stem 436. In the example, the first end 438 of the loading valve stem 436 includes a soft or compliant seat 480 to engage the relief valve plug 464 to operatively couple the loading valve plug 440 to the loading diaphragm 406. In this manner, the relief valve plug 464 may float separately from the loading valve stem 436 to reduce misalignment between the loading valve stem 436, the loading valve plug 440, the loading diaphragm 406, the body 404, etc. As a result, the loading valve stem 436, the loading valve plug 440, the loading diaphragm 406 and the body 404 may be manufactured with greater tolerances, thereby reducing the cost of manufacturing and simplifying assembly.

In operation, the loading diaphragm 406 may move between at least a first position, a second position, and a third position in response to a pressure of the process fluid sensed at the loading outlet 426. In the first position, the loading spring 416 exerts a spring force on the first side 412 of the loading diaphragm 406 to cause the loading diaphragm 406 to move toward the second chamber 430. The diaphragm 406 moves to the first position when the pressure of the process fluid at the loading outlet 426 exerts a first force on the second side 428 of the loading diaphragm 406 via the second chamber 430 that is less than the spring force exerted by the loading spring 416 on the first side 412 of the loading diaphragm 406. In turn, the loading diaphragm 406 moves the loading valve plug 440 to a first position via the loading valve stem 436. In the first position, the loading valve plug 440 moves away from the loading valve seat 434 to allow the flow of fluid between the loading inlet 424 and the loading outlet 426 (e.g., an open condition).

In the open condition, the internal relief valve apparatus 402 is in a closed condition to prevent the flow of fluid between the first chamber 414 and the second chamber 430. The relief spring 476 biases the relief valve plug 464 toward the soft or compliant seat 480. High pressure fluid at the loading inlet 424 reduces to a loading pressure (e.g., a desired loading pressure) when the fluid flows through the orifice 437 to the loading outlet 426 based on the position of the loading valve plug 440 relative to the loading valve seat 434. The loading pressure is to be supplied to, for example, a loading chamber (e.g., the loading chamber 124 of FIG. 1) of a main regulator (e.g., the main regulator 104 of FIG. 1). The loading spring 416 may be adjusted (e.g., compressed or decompressed) via an adjusting screw 482 to increase or decrease the force exerted on the first side 412 of the loading diaphragm 406.

The second chamber 430 senses the pressure of the fluid at the loading outlet 426 via the channel 432. The loading diaphragm 406 moves to a second position (FIG. 4A) when the pressure of the process fluid at the loading outlet 426 exerts a second force on the second side 428 of the loading diaphragm 406 that is greater (e.g., slightly greater) than to the spring force exerted by the loading spring 416 to the first side 412 of the loading diaphragm 406. In turn, in the second position, the loading diaphragm 406 causes the loading valve plug 440 to move toward the loading valve seat 434. The closing spring 444 biases the loading valve plug 440 toward the loading valve seat 434 to sealingly engage the loading valve seat 434 to prevent the flow of fluid between the loading inlet 424 and the loading outlet 426 (i.e., a lock-up condition). A lock-up condition occurs when the loading regulator 400 prevents the flow of fluid between the loading inlet 424 and the loading outlet 426. In the lock-up condition, the relief spring 476 continues to bias the relief valve plug 464 toward the first end 438 of the loading valve stem 436 to prevent the flow of fluid between the first chamber 414 and the second chamber 430.

The restrictive member 468 provides a frictional resistance to restrict or oppose the relief valve seat 448 from moving away from the relief valve plug 464 when the loading diaphragm 406 enters the second position and/or the loading regulator 400 enters a lock-up condition (FIG. 4A). Thus, upon reaching or entering (i.e., at the onset of) the lock-up condition, the relief valve apparatus 402 is not in a bleed condition, i.e., does not allow the flow of fluid between the first chamber 414 and the second chamber 430.

When coupled to a regulator, such as the main regulator 104 of FIG. 1, the pressure of the fluid at the outlet 116 continues to increase when the loading regulator 400 enters the lock-up condition. This increase in outlet fluid pressure causes the main regulator 104 to enter a lock-up condition (i.e., provide substantially zero flow between the inlet 114 and the outlet 116). Thus, the main regulator 104 enters a lock-up condition when the pressure of the fluid at the outlet 116 is greater than the pressure of the fluid at the outlet 116 that causes the loading regulator 400 to enter the lock-up condition. As a result, the example internal relief valve apparatus 402 prevents fluid communication between the first chamber 414 and the second chamber 430 at the onset of the main regulator 104 lock-up. Thus, the internal relief valve apparatus 402 is configured (e.g., via the restrictive member 468) to bleed at a greater fluid pressure than the fluid pressure that causes onset of the main regulator lock-up.

To overcome the force (e.g., a frictional force) exerted by the restrictive member 468, the pressure of the fluid at the loading outlet 426 applies or exerts a force to the second side 428 of the loading diaphragm 406 via the second chamber 430 that is substantially greater than the force applied by the fluid to cause a lock-up condition of the loading regulator 400 (and also greater than the spring force applied by the loading spring 416 to the first side 412 of the loading diaphragm 406).

As the pressure of the process fluid at the loading outlet 426 increases (and causes the main regulator 104 to enter a lock-up condition), the loading diaphragm 406 and the relief valve seat 448 move to the third position (FIG. 4B) toward the first chamber 414, thereby causing the relief valve plug 464 to separate or move away from the relief valve seat 448 to allow the flow fluid between the first and second chambers 414 and 430. In other words, the internal relief valve apparatus 402 does not allow venting or bleeding of the process fluid upon or at the onset of a lock-up condition of the loading regulator 400 and/or the main regulator 104. Instead, the internal relief valve apparatus 402 vents or bleeds the fluid if an outlet pressure is substantially greater than an outlet pressure that causes such a lock-up condition, but less than an outlet pressure that causes an over pressure protection device (e.g., the over pressure protection device 108 of FIG. 1) operatively coupled to the example loading regulator 400 to activate.

Thus, when the loading diaphragm 406 and the relief valve seat 448 move from the second position (i.e., corresponding to a lock-up condition) of FIG. 4A to the third position (i.e., corresponding to a bleed position) shown in FIG. 4B, the internal relief valve apparatus 402 allows the flow of fluid between the first chamber 414 and the second chamber 430. As a result, the example restrictive member 468 provides a substantial deadband or substantial separation between a lock-up condition of the loading regulator 400 and/or the main regulator 104 and a bleed condition of the relief valve apparatus 402. In one natural gas application in which a 2 psi control pressure (e.g., downstream or outlet pressure) is desired, the bleed condition of the internal relief valve apparatus 402 may be set or configured to activate when the outlet fluid pressure reaches 3 psi. Such a setting is greater than the pressure of the fluid that causes lock-up of the loading regulator 400 (e.g., 2.2 psi), and greater than the pressure of the fluid that causes lock-up of the main regulator 104 (e.g., 2.8 psi), but less than the pressure needed to activate an over pressure device (e.g., 4.5 psi).

In other words, the restrictive member 468 controls the pressure offset between an outlet fluid pressure that causes onset of a bleed condition of the internal relief valve apparatus 402 and an outlet fluid pressure that causes onset of loading regulator and/or main regulator lock-up. Thus, the example relief valve apparatus 402 enables an over pressure protection device to be used with pressure-loaded regulators without the need for an external relief valve (e.g., the external relief valve 108 of FIG. 1).

Figure 5A:
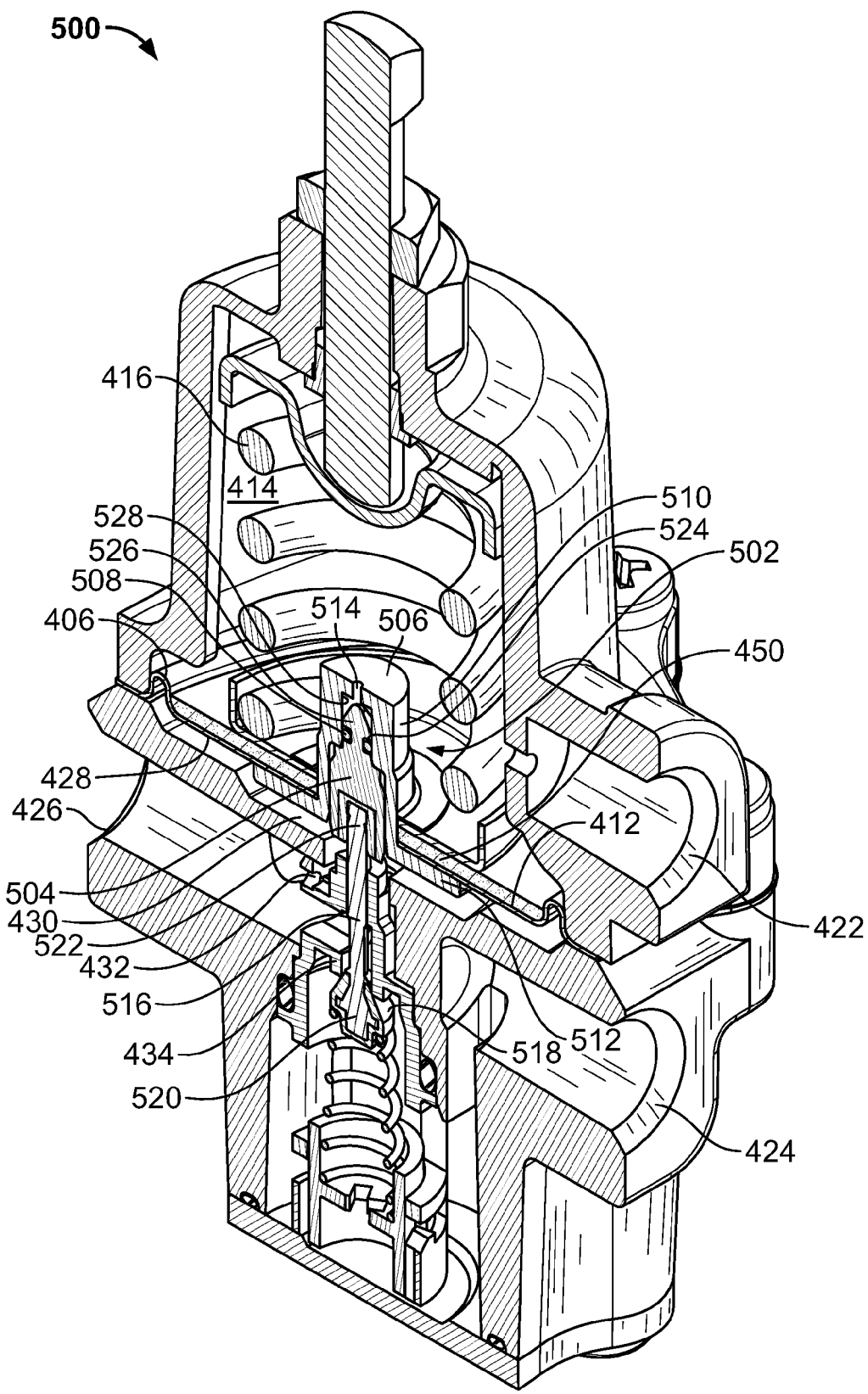
FIG. 5A illustrates a cross-sectional view of an example loading regulator having another example internal relief valve apparatus described herein.
Figure 5B:
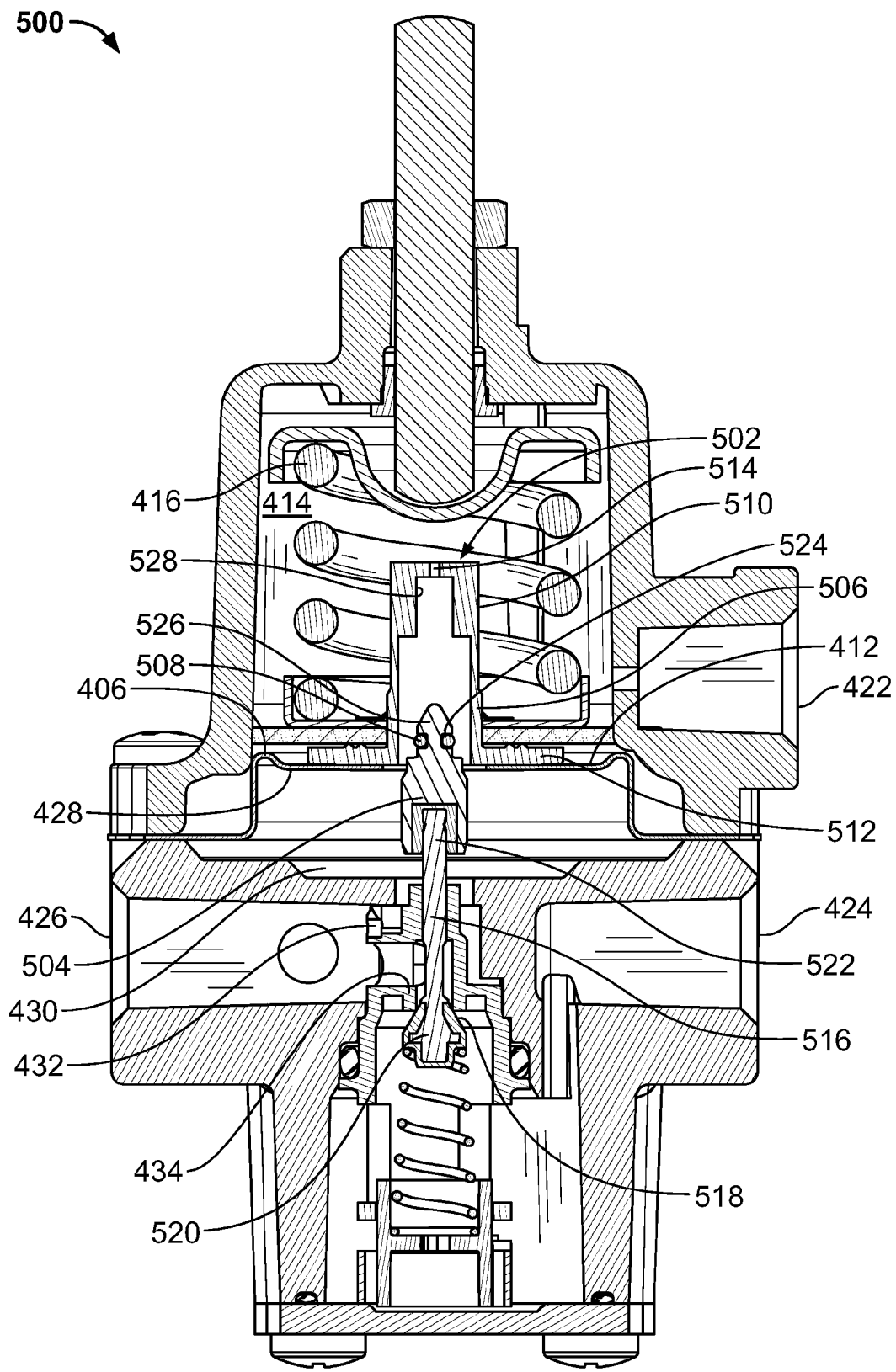
FIG. 5B illustrates another cross-sectional view of the example loading regulator of FIG. 5A.
Figure 5C:
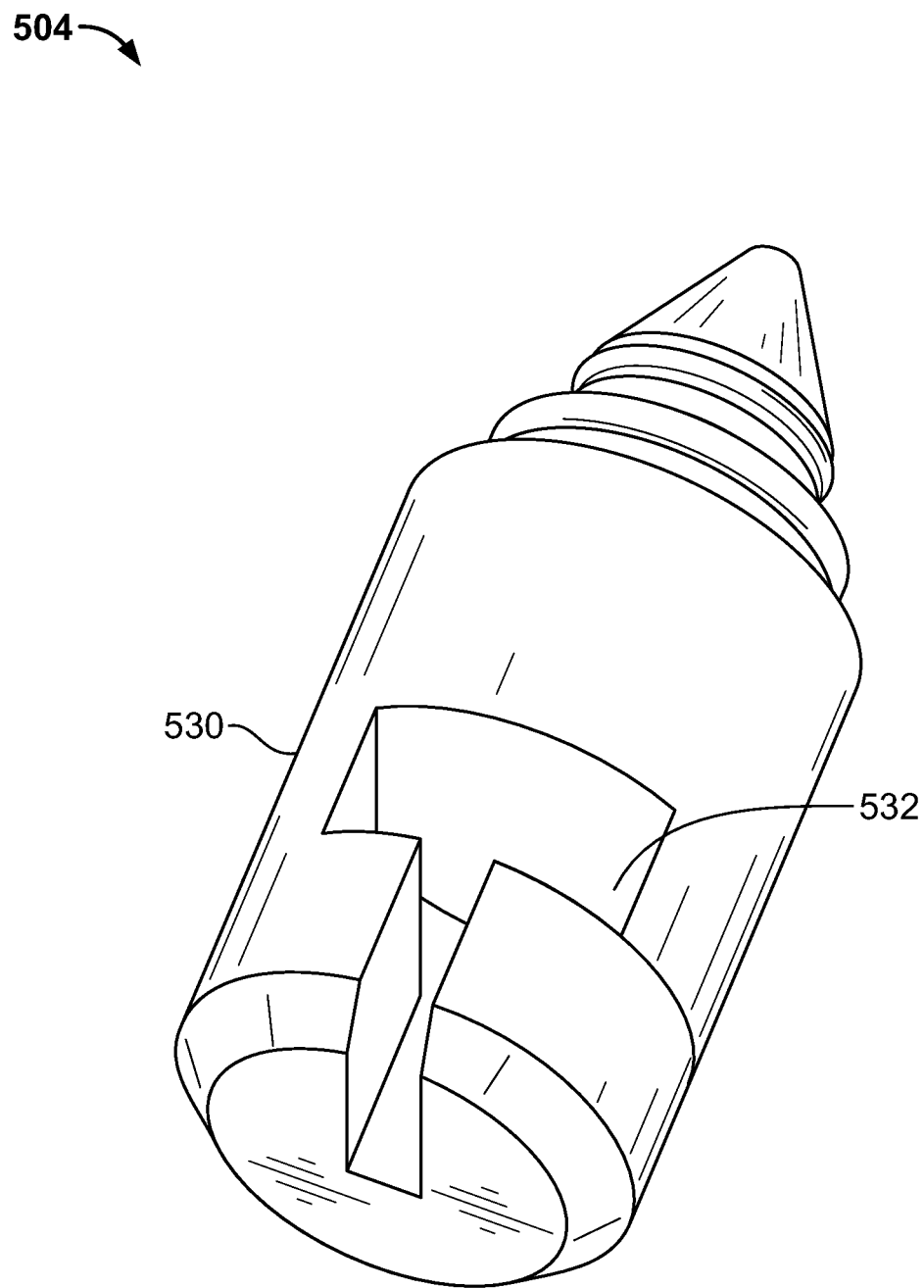
FIG. 5C illustrates an example valve plug of used in the example loading regulator of FIGS. 5A and 5B.

FIG. 5A illustrates a cross-sectional view of an example loading regulator 500 implemented with another example internal relief valve apparatus or assembly 502 described herein. FIG. 5B illustrates another cross-section view of the example loading regulator 500 of FIG. 5A showing the example internal relief valve apparatus or assembly 502 in a bleed condition. FIG. 5C illustrates an example relief valve plug 504 that may be used with the example internal relief valve apparatus 502. Those components of the example loading regulator 500 that are substantially similar or identical to the components of the example loading regulator 400 described above have reference numbers corresponding to the components of FIGS. 4A and 4B to which they are identical or similar and will not be described in detail again below. Instead, the interested reader is referred to the corresponding descriptions described above in connection with FIGS. 4A and 4B.

Referring to FIGS. 5A and 5B, the example internal relief valve apparatus or assembly 502 includes the relief valve plug 504 slidably coupled to a relief valve seat 506 and having at least one restrictive or frictional member 508 (e.g., an O-ring) disposed between the relief valve plug 504 and the relief valve seat 506. The relief valve seat 506 includes a cylindrical body 510 having a flange 512. The cylindrical body 510 includes an aperture or passageway 514 to fluidly couple the first and second chambers 414 and 430 when the example loading regulator 500 is in the bleed condition (FIG. 5B). The flange 512 engages the second side 428 of the loading diaphragm 406 to couple the relief valve seat 506 to the diaphragm 406. A loading valve stem 516 is coupled to a first or loading valve plug 518 at a first end 520 and to the relief valve plug 504 at a second end 522. The loading valve plug 518 engages the loading valve seat 434 to prevent the flow of fluid between the loading inlet 424 and the loading outlet 426 and moves away from the loading valve seat 434 to allow the flow of fluid between the loading inlet 424 and the loading outlet 426. In the example, the restrictive member 508 is disposed in a groove 524 of the relief valve plug 504 to provide a seal to prevent the flow of fluid between the first chamber 414 and the second chamber 430 when a first portion 526 of the relief valve plug 504 is positioned within a first portion 528 of the passageway 514.

As most clearly shown in FIG. 5C, in the illustrated example, the relief valve plug 504 includes a cylindrical body portion 530 having a cavity 532 to receive the second end 522 of the loading valve stem 516. The cavity 532 may have a shape that is complementary to the shape of the second end 522 of the loading valve stem 516. As depicted, the second end 522 of the example loading valve stem 516 is press fit within the cavity 532 of the relief valve plug 504. However, in other examples, the loading valve stem 516 may be threadably coupled to the relief valve plug 504 and/or may be coupled to the relief valve plug 504 via any other suitable fastening mechanism(s). Coupling the loading valve stem 516 to the relief valve plug 504 eliminates the need to provide a relief spring (e.g., the relief spring 476 of FIGS. 4A and 4B).

In operation, a build-up of fluid pressure at the loading outlet 426 exerts a force on the second end 428 of the loading diaphragm 406 to bias the loading diaphragm 406 toward the first chamber 414. A fluid pressure at the loading outlet 426 that is greater than the force exerted on the first side 412 of the loading diaphragm 406 by the loading spring 416 causes the loading diaphragm 406 to move toward the first chamber 414. In turn, the closing spring 444 biases the loading valve plug 518 toward the loading valve seat 434. Engagement of the loading valve plug 518 with the loading valve seat 434 as shown in FIG. 5A (i.e., a lock-up condition) prevents further rectilinear displacement of the loading valve plug 518 toward the first chamber 414. As a result, the relief valve plug 504 is also prevented from linearly displacing or moving toward the first chamber 414. However, the restrictive member 508 provides resistance, requiring additional force applied to the second side 428 of the loading diaphragm 406 by the process fluid to move the relief valve seat 506 away from the relief valve plug 504. Thus, the restrictive member 508 controls a pressure offset between a regulator outlet fluid pressure that causes onset of a bleed condition of the internal relief valve apparatus 502 and a regulator outlet fluid pressure that causes onset of loading regulator lock-up.

Fluid pressure at the loading outlet 426 greater than the fluid pressure to cause a lock-up condition (FIG. 5A) causes the loading diaphragm 406 to move toward the first chamber 414 when the pressure increases to overcome the resistance (e.g., frictional resistance) provided by the restrictive member 508. As the fluid pressure increases to overcome the resistance of the restrictive member 508, the relief valve seat 506, coupled to the loading diaphragm 406 via the diaphragm plate 450, also moves away from the relief valve plug 504 as the loading diaphragm 406 moves to the third position shown in FIG. 5B to fluidly couple the first and second chambers 414 and 430. Although only one restrictive member 508 is shown, a plurality of restrictive members may be disposed between the relief valve plug 504 and the relief valve seat 506 to increase or decrease the force required to move the internal relief valve apparatus 502 to a bleed condition as shown in FIG. 5B.

In other examples, at least a portion of the relief valve plug 504 may be made of, for example, rubber, Teflon®, or any other suitable material to frictionally engage the relief valve seat 506 to provide a substantial pressure offset between a fluid pressure that causes the onset of a lock-up condition and a fluid pressure that causes the onset of a bleed condition. In yet other examples, the relief valve plug 504 may include annular ridges, deformations, protrusions, or any other suitable geometries and/or materials to enable the relief valve plug 504 to engage the relief valve seat 506 to provide the substantial pressure offset. In yet other examples, the relief valve seat 506 may include annular grooves to receive O-rings, a liner made of, for example, rubber, protrusions and/or other geometry and/or material so that the relief valve plug 504 frictionally engages the relief valve seat 506 to provide the substantial pressure offset.

Further, similar to the example loading regulator 400 of FIGS. 4A and 4B, the example loading regulator 500 may be operatively coupled to a main regulator (e.g., the main regulator 104). Similar to the example loading regulator 400 described above in connection with FIGS. 4A and 4B, the example internal relief valve apparatus 502 of the loading regulator 500 may be configured or set to activate at an outlet fluid pressure that is greater than an outlet fluid pressure that causes a main regulator to lock-up.

Figure 6A:
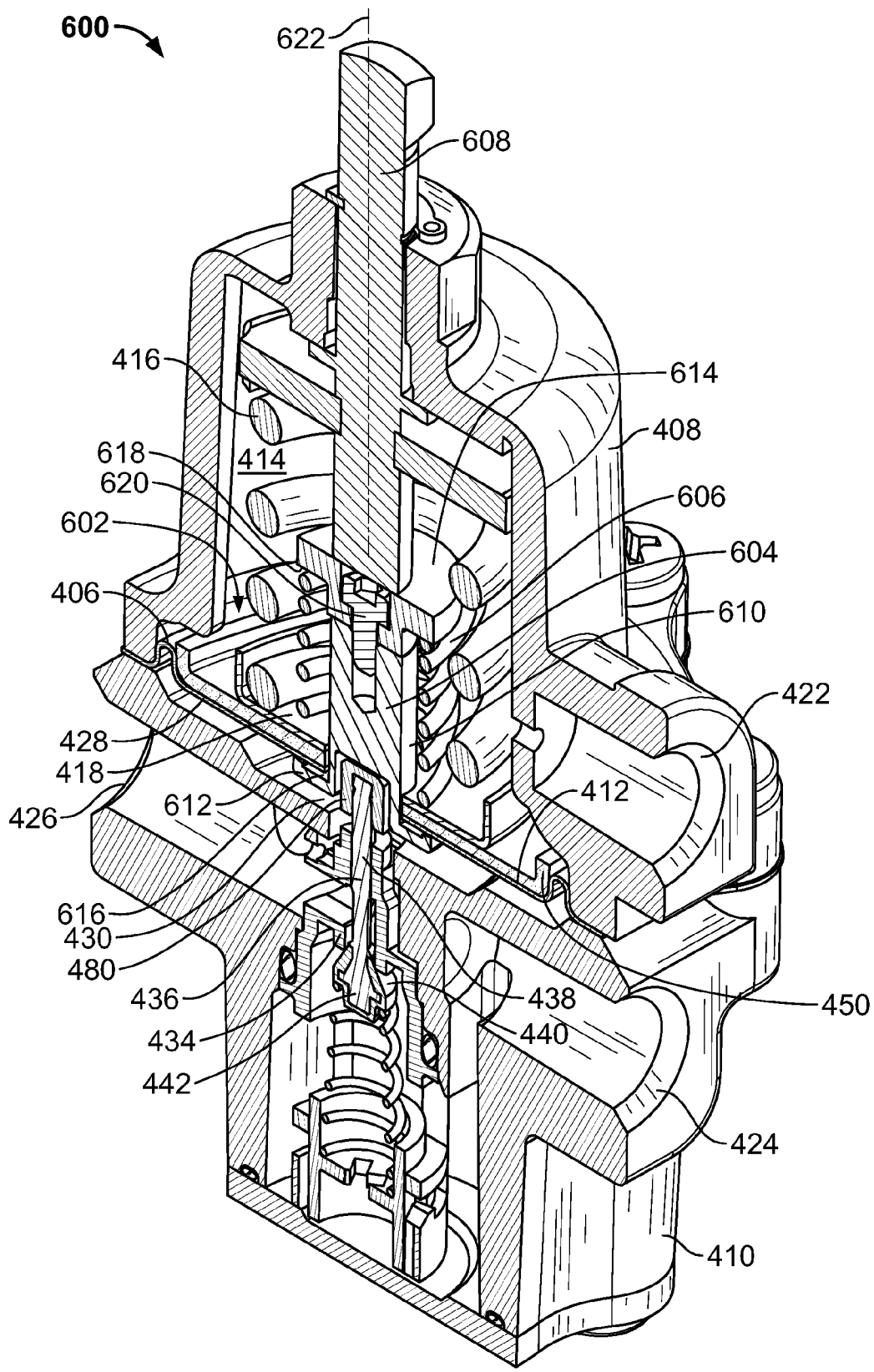
FIG. 6A illustrates a cross-sectional view of an example loading regulator having yet another example internal relief valve apparatus described herein.
Figure 6B:
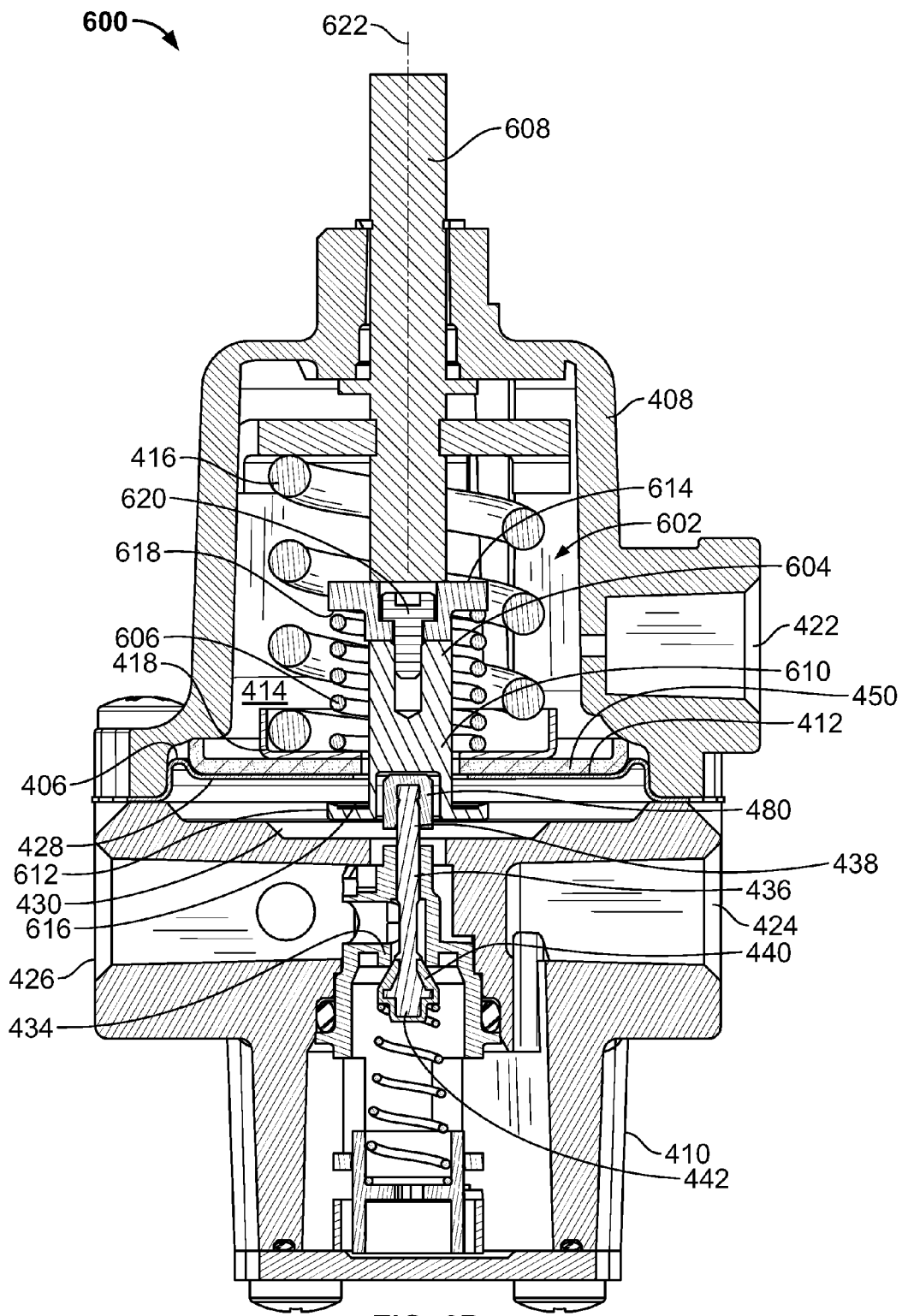
FIG. 6B illustrates another cross-sectional view of the example loading regulator of FIG. 6A.

FIG. 6A illustrates another example loading regulator 600 implemented with yet another example internal relief valve apparatus or assembly 602 described herein. FIG. 6B is a cross-sectional view of the example loading regulator of FIG. 6A showing the internal relief valve apparatus 602 in a bleed condition. Those components of the example loading regulator 600 that are substantially similar or identical to the components of the example loading regulator 400 described above have reference numbers corresponding to the components of FIGS. 4A and 4B to which they are identical or similar and will not be described in detail again below. Instead, the interested reader is referred to the corresponding descriptions described above in connection with FIGS. 4A and 4B.

Referring to FIGS. 6A and 6B, the example internal relief valve apparatus 602 includes a relief valve seat 604, a biasing member 606 (e.g., a relief spring), and a travel stop 608. The relief valve seat 604 includes a stem portion 610, a flange portion 612, and a top portion 614. The relief valve seat 604 is coupled to the loading diaphragm 406 via the diaphragm plate 450. The flange portion 612 includes a seating surface 616 to receive a metal disc, an elastomeric disc, and/or any other disc or sealing member. The seating surface 616 of the flange portion 612 engages the second side 428 of the loading diaphragm 406 to prevent the flow of fluid between the first and second chambers 414 and 430 when the internal relief vale apparatus 602 is in a closed position (FIG. 6A). The biasing member 606 is disposed between a second flange or surface 618 of the relief valve seat 604 and a surface of the first casing 408 or, as shown, the first spring seat 418. The biasing member 606 biases the seating surface 616 of the relief valve seat 604 toward (e.g., to engage) the second side 428 of the loading diaphragm 406. The travel stop 608 is coupled to the first casing 408 and has at least a portion disposed within the first chamber 414. The top portion 614 is removably coupled to the stem portion 610 via a fastener 620.

In operation, a pressure of the process fluid at the loading outlet 426 that exerts a force on the second side 428 of the loading diaphragm 406 that is greater than the force exerted on the first side 412 of the loading diaphragm 406 by the loading spring 416 causes a lock-up condition (FIG. 6A), in which the loading valve plug 440 engages the loading valve seat 434 to prevent the flow of fluid between the loading inlet 424 and the loading outlet 426. When the example loading regulator 500 is operatively coupled to a main regulator (e.g., the main regulator 104), the internal relief valve apparatus 602 may be configured or set to activate at an outlet fluid pressure that is greater than an outlet fluid pressure that causes a main regulator to lock-up.

Fluid at the loading outlet 426 having a pressure that is greater than the pressure of the fluid to cause the lock-up condition causes the loading diaphragm 406 to continue to move toward the first chamber 414 (e.g., the loading spring 416 compresses). As a result, the top portion 614 of the relief valve seat 604 engages the travel stop 608 to limit or prevent further linear movement or travel of the relief valve seat 604 along an axis 622 toward the first chamber 414. However, as outlet pressure increases further, the loading diaphragm 406 continues to move toward the first chamber 414, thereby causing the biasing member 606 to compress and the loading diaphragm 406 to move away from the seating surface 616 (i.e., the flange portion 612) of the relief valve seat 604. As a result, fluid flows between the first chamber 414 and the second chamber 430 (i.e., a bleed condition) and to, for example, the atmosphere via the vent 422. Thus, the internal relief valve apparatus 602 controls or provides means for controlling a pressure offset between a regulator outlet fluid pressure associated with onset of a bleed condition of the internal relief valve apparatus 602 and a regulator outlet fluid pressure associated with onset of loading regulator lock-up.

Figure 7:
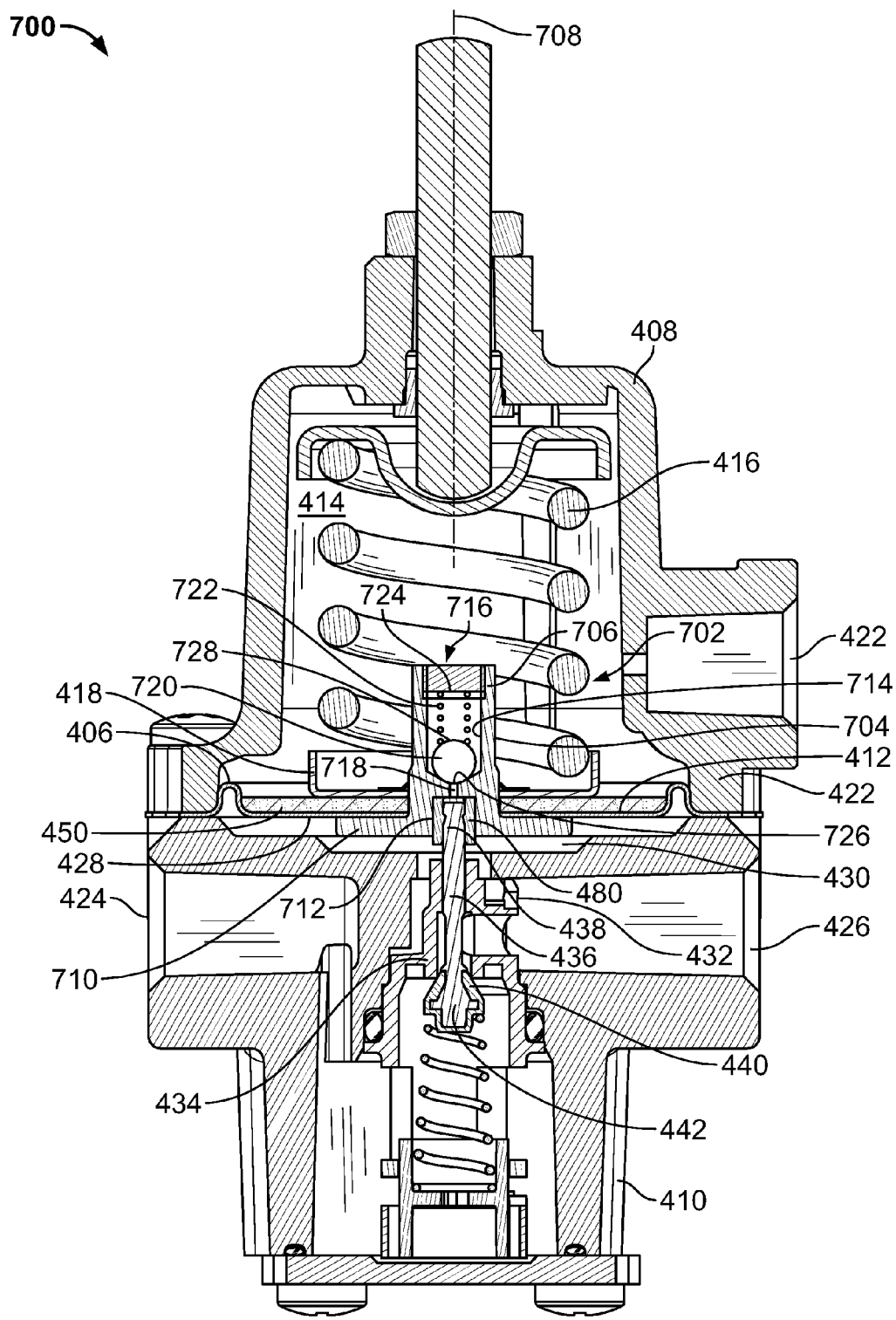
FIG. 7 illustrates a cross-sectional view of an example loading regulator having yet another example internal relief valve apparatus described herein.

FIG. 7 illustrates an example loading regulator 700 having yet another example internal relief valve apparatus or assembly 702 described herein. Those components of the example loading regulator 700 that are substantially similar or identical to the components of the example loading regulator 400 described above have reference numbers corresponding to the components of FIGS. 4A and 4B to which they are identical or similar and will not be described in detail again below. Instead, the interested reader is referred to the corresponding descriptions described above in connection with FIGS. 4A and 4B.

The example internal relief valve apparatus 702 includes a relief valve seat 704 coupled to the loading diaphragm 406. The relief valve seat 704 includes a cylindrical body 706 extending along a longitudinal axis 708 and a flanged portion 710. The cylindrical body 706 includes a cavity 712 sized to engage or receive the first end 438 of the loading valve steam 436 (e.g., the soft seat 480). The cylindrical body 706 also includes a chamber 714 having a relief valve plug 716 disposed therein and having a first aperture 718 to fluidly couple the cavity 712 and the chamber 714. In the illustrated example, the relief valve plug 716 is depicted as a check valve. The check valve includes a ball 720 that is biased toward the first aperture 718 via a bias member 722 (e.g., a spring). The bias member 722 is disposed between a spring seat 724 and the ball 720.

In operation, the relief valve seat 704 and the loading diaphragm 406 move to a lock-up condition (FIG. 7) when the pressure of the process fluid at the loading outlet 426 exerts a force to the second side 428 of the loading diaphragm 406 that is greater than the force exerted on the first side 412 of the loading diaphragm 406 by the loading spring 416. In the lock-up condition, the loading valve plug 440 engages the loading valve seat 434 to prevent the flow of fluid between the loading inlet 424 and the loading outlet 426. When the example loading regulator 700 is operatively coupled to a main regulator (e.g., the main regulator 104), the internal relief valve apparatus 702 may be configured or set to activate at an outlet fluid pressure that is greater than an outlet fluid pressure that causes a main regulator to lock-up. As the fluid pressure at the loading outlet 426 increases to a fluid pressure greater than a pressure in which the loading regulator 700 and/or a main regulator enters the lock-up condition, the loading diaphragm 406 and the relief valve seat 704 continue to move in a linear path along the axis 708 toward the first chamber 414. As a result, the relief valve seat 704 moves away from the first end 438 of the loading valve stem 436 to expose or fluidly couple the first aperture 718 to the fluid in the second chamber 430 and, thus, the fluid at the loading outlet 426 via the channel 432.

To fluidly couple the first and second chambers 414 and 430, the pressure of the fluid exerts a force on a first side 726 of the ball 720 via the first aperture 718 that is greater than the force exerted by the biasing member 722 on a second side 728 of the ball 720. When the fluid pressure overcomes the force exerted by the biasing member 722, the ball 720 moves away from the first aperture 718 toward the first chamber 414. As a result, the fluid flows between the first and second chambers 414 and 430 (i.e., the bleed condition of FIG. 7) and to the vent 422. Thus, the internal relief valve apparatus 702 controls a pressure offset between a regulator outlet fluid pressure associated with onset of a bleed condition of the internal relief valve apparatus 702 and a regulator outlet fluid pressure associated with onset of loading regulator lock-up.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. A loading regulator having an internal relief valve apparatus, comprising:
  a body having a loading diaphragm disposed between a first casing and a second casing, the first casing and a first side of the loading diaphragm define a first chamber and the second casing and a second side of the loading diaphragm define a second chamber; and
  a relief valve assembly coupled to the loading diaphragm including:
    a relief valve plug; and
    a relief valve seat having an aperture that forms a passageway to fluidly couple the first chamber and the second chamber, the relief valve seat to move away from the relief valve plug to provide a pressure offset that prevents fluid flow through the passageway when an outlet fluid pressure of the loading regulator is between an outlet fluid pressure that causes onset of a bleed condition of the loading regulator and an outlet fluid pressure that causes onset of a lock-up condition of the loading regulator.

2. A loading regulator as defined in claim 1, wherein the loading regulator is configured to operatively couple to a main regulator to provide a loading pressure to the main regulator, wherein the relief valve assembly is to move to the bleed condition in response to an outlet pressure of the main regulator being substantially greater than a pressure at which the main regulator enters a lock-up condition, wherein the main regulator enters the lock-up condition at a pressure substantially greater than the pressure at which the loading regulator enters the lock-up condition.

3. A loading regulator as defined in claim 2, wherein the relief valve assembly comprises a seal or a spring to cause the relief valve to move to the bleed position in response to a pressure substantially greater than the pressure at which the loading regulator enters the lock-up condition or the pressure at which the main regulator enters the lock-up condition.

4. A loading regulator as defined in claim 1, further comprising a seal disposed between at least a portion of the relief valve plug and a portion of the relief valve seat.

5. A loading regulator defined in claim 4, wherein the seal comprises at least one O-ring.

6. A loading regulator as defined in claim 1, further comprising a loading valve stem operatively coupled to the loading diaphragm and having a loading valve plug at a first end, the loading valve plug to engage a loading valve seat disposed in an orifice of the body between a loading inlet and a loading outlet to prevent the flow of fluid through the orifice when the loading regulator enters the lock-up condition, the loading valve plug to move away from the loading valve seat to allow the flow of fluid through the orifice when a pressure at the loading outlet is less than a pressure associated with the onset of the lock-up condition.

7. A loading regulator defined in claim 6, further comprising a compliant seat coupled to a second end of the loading valve stem to engage the relief valve plug to operatively couple the loading valve plug and the loading diaphragm.

8. A loading regulator defined in claim 7, further comprising a biasing element to bias the relief valve plug toward the loading valve stem.

9. A loading regulator defined in claim 6, wherein a second end of the loading valve stem is rigidly coupled to the relief valve plug.

10. A loading regulator defined in claim 9, wherein the relief valve plug includes a cylindrical body portion having a cavity shaped to receive the second end of the loading valve stem.

11. A loading regulator defined in claim 1, wherein the relief valve seat moves into engagement with the relief valve plug to a closed position to prevent fluid flow through the passageway when an outlet fluid pressure is less than a pre-set pressure of the loading regulator, the relief valve seat moves away from the relief valve plug to an intermediate position to prevent fluid flow through the passageway when the outlet fluid pressure of the main regulator is between a pressure at which the loading regulator enters the lock-up condition and a pressure that causes onset of the bleed condition to provide the pressure offset, and the relief valve seat moves away from the valve relief plug to an open position to allow fluid flow between the first and second chambers when the outlet pressure is greater than a pressure that causes the onset of the bleed condition.

12. A loading regulator having an internal relief valve apparatus comprising:
a diaphragm disposed within a body of the loading regulator between a first chamber and a second chamber, the diaphragm to move between at least a first position, a second position, and a third position in response to a process fluid pressure sensed by the second chamber;
a relief valve plug; and
a relief valve seat coupled to the diaphragm so that the relief valve seat moves relative to the relief valve plug when the diaphragm moves between the second position and the third position, the relief valve seat including an opening to form a passageway to fluidly couple the first chamber and the second chamber,
the relief valve plug to engage the opening of the relief valve seat to prevent the flow of fluid between the first chamber and the second chamber when the diaphragm and the relief valve seat are in the first position, the relief valve plug to be positioned away from the opening of the relief valve seat during a pressure offset condition to prevent fluid flow between the first and second chambers when the relief valve seat and the diaphragm are in the second position, and, the relief valve plug to be positioned away from the opening of the relief valve seat to allow fluid flow between the first chamber and the second chamber when the relief valve seat and the diaphragm are in the third position.

13. A loading regulator as defined in claim 12, wherein the loading regulator is configured to operatively couple to a main regulator to provide a loading pressure to the main regulator, wherein the relief valve seat moves away from the relief valve plug to the third position to allow the flow of fluid between the first chamber and the second chamber in response to an outlet pressure of the main regulator being substantially greater than a pressure at which the main regulator enters a lock-up condition.

14. A loading regulator as defined in claim 12, further comprising an O-ring disposed between at least a portion of the relief valve plug and the relief valve seat to set an outlet pressure at which the relief valve plug moves to the third position.

15. A loading regulator as defined in claim 12, wherein when the relief valve seat and the diaphragm are in the first position, the loading regulator allows process fluid to flow through a pathway defined by the loading regulator between a loading inlet and a loading outlet and the relief valve plug is in engagement with the relief valve seat to prevent fluid flow through the opening of the relief valve seat.

16. A loading regulator as defined in claim 12, wherein the second position is associated with a lock-up condition of the loading regulator in which the flow of process fluid between a loading inlet and a loading outlet is prevented.

17. A loading regulator as defined in claim 12, wherein the third position is associated with a bleed condition in which the flow of fluid between the first chamber and the second chamber is permitted.

18. A loading regulator as defined in claim 12, wherein the relief valve seat comprises a cylindrical member having a flanged portion and a cavity.

19. A loading regulator as defined in claim 18, wherein the relief valve plug comprises a check valve disposed within at least a portion of the cylindrical member of the relief valve seat.

20. A loading regulator as defined in claim 18, further comprising a loading valve stem having a loading valve plug coupled at a first end and a compliant seat coupled at a second end, the compliant seat to engage a portion of the relief valve seat or the relief valve plug to operatively couple the loading valve plug to the diaphragm, the loading valve plug spaced from a loading valve seat in the first position to allow the flow of fluid between a loading inlet and a loading outlet of the loading regulator and is to engage the loading valve seat in the second position and the third position to prevent the flow of fluid between the loading inlet and the loading outlet.

* * * * *